US010013196B2

(12) United States Patent
Tylik et al.

(10) Patent No.: US 10,013,196 B2
(45) Date of Patent: Jul. 3, 2018

(54) POLICY BASED PROVISIONING OF STORAGE SYSTEM RESOURCES

(71) Applicant: EMC Corporation, Hopkinton, MA (US)

(72) Inventors: Dmitry Nikolayevich Tylik, Westborough, MA (US); Sergey Alexandrovich Alexeev, St. Petersburg (RU); Alexey Vladimirovich Shusharin, St. Petersburg (RU)

(73) Assignee: EMC IP Holding Company LLC, Hopkinton, LA (US)

( * ) Notice: Subject to any disclaimer, the term of this patent is extended or adjusted under 35 U.S.C. 154(b) by 0 days.

(21) Appl. No.: 14/646,422

(22) PCT Filed: Sep. 26, 2014

(86) PCT No.: PCT/RU2014/000728
§ 371 (c)(1),
(2) Date: May 21, 2015

(87) PCT Pub. No.: WO2016/048185
PCT Pub. Date: Mar. 31, 2016

(65) Prior Publication Data
US 2016/0259586 A1 Sep. 8, 2016

(51) Int. Cl.
G06F 3/06 (2006.01)

(52) U.S. Cl.
CPC .......... G06F 3/0631 (2013.01); G06F 3/0604 (2013.01); G06F 3/0673 (2013.01); G06F 3/0685 (2013.01); G06F 3/0689 (2013.01)

(58) Field of Classification Search
CPC .... G06F 3/0631; G06F 3/0673; G06F 3/0604; G06F 3/0685; G06F 3/0689; G06F 3/0629; G06F 3/0605; G06F 3/0632; G06F 3/0635; G06F 3/0688; G06F 3/067; G06F 3/0679; G06F 3/0683
See application file for complete search history.

(56) References Cited

U.S. PATENT DOCUMENTS 7,383,410 B2 *  6/2008 Dalal .................... G06F 3/0605
                                                  707/999.202
7,949,637 B1    5/2011 Burke
8,307,026 B2 * 11/2012 Gusler .................. G06F 9/5011
                                                  709/200

(Continued)

Primary Examiner — Michael Krofcheck
(74) Attorney, Agent, or Firm — Muirhead and Saturnelli, LLC

(57) ABSTRACT

Described are techniques for provisioning storage for a logical device including receiving at least one capability profile identifying a first set of storage resource configurations; receiving a request to provision storage for the logical device, the request including a policy profile identifying a second set storage resource configurations; determining a third set of zero or more storage resource configurations, the third set being a set intersection of the first set and the second set; determining whether the third set includes at least one storage resource configuration; and if it is determined that the third set includes at least one storage resource configuration, selecting one of the storage resource configurations of the third set and provisioning storage of the logical device in accordance with the selected storage resource configuration of the third set.

21 Claims, 10 Drawing Sheets

(56) References Cited

U.S. PATENT DOCUMENTS

| | | | |
|---|---|---|---|
| 8,566,546 B1* | 10/2013 | Marshak | G06F 3/0604 |
| | | | 711/112 |
| 8,583,838 B1 | 11/2013 | Marshak et al. | |
| 2004/0120225 A1* | 6/2004 | Dalal | G06F 3/0605 |
| | | | 369/30.04 |
| 2005/0010378 A1* | 1/2005 | Zeidman | G06F 17/505 |
| | | | 703/1 |
| 2005/0097243 A1* | 5/2005 | Yamashita | G06F 3/0605 |
| | | | 710/38 |
| 2005/0273452 A1* | 12/2005 | Molloy | G06F 17/30595 |
| 2007/0198512 A1* | 8/2007 | Zeidman | G06F 17/505 |
| 2009/0070541 A1 | 3/2009 | Yochai | |
| 2012/0102291 A1* | 4/2012 | Cherian | G06F 9/5044 |
| | | | 711/170 |
| 2015/0339165 A1* | 11/2015 | Tsirkin | G06F 9/5016 |
| | | | 718/1 |

\* cited by examiner

| RANK | FLASH | DRIVE TYPE | RAID TYPE | FAST CACHE | FAST VP | SPACE EFF |
|---|---|---|---|---|---|---|
| 1 | YES | EFD | RAID10 | OFF | N/A | THICK |
| 2 | YES | EFD | RAID10 | OFF | N/A | THIN |
| 3 | YES | EFD | RAID5 | OFF | N/A | THICK |
| 4 | YES | EFD | RAID5 | OFF | N/A | THIN |
| 5 | YES | EXTREME MT | MIXED | OFF | HIGHEST | THICK |
| 6 | YES | EXTREME MT | MIXED | OFF | HIGHEST | THIN |
| 7 | YES | EXTREME MT | MIXED | OFF | AUTOTIER HIGH | THICK |
| 8 | YES | EXTREME MT | MIXED | OFF | AUTOTIER HIGH | THIN |
| 9 | YES | EXTREME MT | MIXED | OFF | AUTOTIER | THICK |
| 10 | YES | EXTREME MT | MIXED | OFF | AUTOTIER | THIN |
| 11 | YES | EXTREME MT | MIXED | OFF | LOWEST | THICK |
| 12 | YES | EXTREME MT | MIXED | OFF | LOWEST | THIN |
| 13 | YES | SAS | RAID10 | ON | N/A | THICK |
| 14 | YES | SAS | RAID10 | ON | N/A | THIN |
| 15 | YES | SAS | RAID5 | ON | N/A | THICK |
| 16 | YES | SAS | RAID5 | ON | N/A | THIN |
| 17 | YES | MULTITIER | MIXED | ON | HIGHEST | THICK |
| 18 | YES | MULTITIER | MIXED | ON | HIGHEST | THIN |
| 19 | YES | MULTITIER | MIXED | ON | AUTOTIER HIGH | THICK |
| 20 | YES | MULTITIER | MIXED | ON | AUTOTIER HIGH | THIN |
| 21 | YES | MULTITIER | MIXED | ON | AUTOTIER | THICK |
| 22 | YES | MULTITIER | MIXED | ON | AUTOTIER | THIN |
| 23 | YES | MULTITIER | MIXED | ON | LOWEST | THICK |
| 24 | YES | MULTITIER | MIXED | ON | LOWEST | THIN |
| 25 | YES | NL-SAS | RAID6 | ON | N/A | THICK |
| 26 | YES | NL-SAS | RAID6 | ON | N/A | THIN |
| 27 | NO | SAS | RAID10 | OFF | N/A | THICK |
| 28 | NO | SAS | RAID10 | OFF | N/A | THIN |
| 29 | NO | SAS | RAID5 | OFF | N/A | THICK |
| 30 | NO | SAS | RAID5 | OFF | N/A | THIN |
| 31 | NO | MULTITIER | MIXED | OFF | HIGHEST | THICK |
| 32 | NO | MULTITIER | MIXED | OFF | HIGHEST | THIN |
| 33 | NO | MULTITIER | MIXED | OFF | AUTOTIER HIGH | THICK |
| 34 | NO | MULTITIER | MIXED | OFF | AUTOTIER HIGH | THIN |
| 35 | NO | MULTITIER | MIXED | OFF | AUTOTIER | THICK |
| 36 | NO | MULTITIER | MIXED | OFF | AUTOTIER | THIN |
| 37 | NO | MULTITIER | MIXED | OFF | LOWEST | THICK |
| 38 | NO | MULTITIER | MIXED | OFF | LOWEST | THIN |
| 39 | NO | NL-SAS | RAID6 | OFF | N/A | THICK |
| 40 | NO | NL-SAS | RAID6 | OFF | N/A | THIN |

FIG. 7

POLICY BASED PROVISIONING OF STORAGE SYSTEM RESOURCES

BACKGROUND

Technical Field

This application is the National Stage of International Application No. PCT/RU2014/000728, filed Sep. 26, 2014. The contents of this application is expressly incorporated herein by reference in its entirety.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of provisioning storage for a logical device comprising: receiving at least one capability profile identifying a first set of one or more storage resource configurations, wherein each storage resource configuration of the first set is a current storage resource configuration supported on a data storage system; receiving a request to provision storage for the logical device, the request including a policy profile identifying a second set of one or more storage resource configurations, wherein each storage resource configuration of the second set is a requested storage resource configuration acceptable for provisioning storage for the logical device; determining a third set of zero or more storage resource configurations, said third set being a set intersection of the first set and the second set; determining whether the third set includes at least one storage resource configuration; and if it is determined that the third set includes at least one storage resource configuration, selecting one of the at least one storage resource configurations of the third set and provisioning storage of the logical device in accordance with the selected one storage resource configuration of the third set. The method may include determining whether the third set includes zero storage resource configurations thereby indicating that no storage resource configuration of the first set supported by the data storage system matches a requested storage configuration of the second set; if the third set includes zero storage resource configurations, performing first processing to select, in accordance with one or more usage criteria, a first storage resource configuration of the first set, said first storage resource configuration determined by the first processing to be a best configuration of the first set to use for provisioning storage for the logical device in accordance with the one or more usage criteria; and provisioning storage of the logical device in accordance with the selected first storage resource configuration of the first set. Determining a third set of zero or more storage resource configurations that is a set intersection of the first set and the second set may include receiving a ranking table including rows of candidate storage resource configurations ranked in accordance with the one or more usage criteria, each row of the ranking table identifying a different candidate storage resource configuration; expressing the first set of storage resource configurations as a first set of one or more rows of the ranking table; expressing the second set of storage resource configurations as a second set of one or more rows of the ranking table; and determining what one or more rows, if any, in the first set of one or more rows match any row in the second set of one or more rows of the ranking table. The rows of the ranking table may be ranked in priority order, from highest to lowest priority, in accordance with a priority ordering of capabilities and, for each of the capabilities, a priority ordering of associated values for said each capability, wherein the priority ordering of the capabilities and the priority ordering of associated values for each of the capabilities may be in accordance with the one or more usage criteria. The policy profile may include at least one capability and at least one constraint associated with said at least one capability. The at least one capability profile may include at least one capability and at least one constraint associated with said at least one capability. A fourth set includes one or more pairs of rows, each pair of rows of the fourth set including a first row from the first set of one or more rows of the ranking table and a second row from the second set of one or more rows of the ranking table, and wherein a distance is defined between each pair of rows of the fourth set, said distance for said each pair of rows representing a distance in the ranking table between the first row of said each pair and the second row of said each pair, and wherein said first processing includes determining one pair of rows of the fourth set having a minimum distance with respect to all distances of all pairs of rows of the fourth set, and the method may include provisioning storage for the logical device in accordance with a storage resource configuration corresponding to the first row of the one pair of rows of the fourth set having the minimum distance. The capabilities may include any of a first capability identifying whether flash-based storage is included in a configuration, a second capability identifying one or more physical device types or storage tiers from which storage can be provisioned in a configuration, a third capability identifying one or more RAID group types from which storage can be provisioned in a configuration, a fourth capability identifying whether an additional caching tier of flash-based storage is used in a configuration, a fifth capability identifying whether automated storage tiering and movement of data between storage tiers is used in a configuration, and a sixth capability identifying whether a logical device having storage provisioned is created as a virtually provisioned logical device. The third set may be a plurality of storage resource configurations each having a corresponding row in the ranking table, and wherein the method may include determining, in accordance with the ranking table, a priority for each of the plurality of storage resource configurations of the third set; selecting, in accordance with the one or more usage criteria, one of the plurality of storage resource configurations of the third set, wherein the one or more usage criteria includes a logical device type included in the request; and provisioning storage for the logical device in accordance with the selected one storage resource configuration of the third set. The logical device may be used by a virtual machine in a virtualization environment. The logical device type may be one of a predefined set of logical device types, and said logical device type may be any of a configuration device including configuration information for a virtual machine of the virtualization environment, a swap device for a virtual machine of the virtualization environment, and a data device used to store data of an application executing in a context of a virtual machine in the virtualization environment. The logical device type may be used to determine an indication of priority of cost efficiency and performance in connection with provisioning storage for the logical device, and wherein said indication may be inferred from the one or more usage criteria used in selecting the one of the plurality of storage resource configurations of the third set. The ranking table may be selected from a plurality of ranking tables, each of the plurality of ranking tables including a priority ranking based on a different set of one or more usage criteria, wherein each of the plurality of ranking tables ranks the candidate storage resource configurations in accordance with cost and performance, said plurality of ranking tables including a first ranking table whereby a first of the candidate storage resource configurations of the first ranking table that is ranked higher than a second of the candidate storage resource configurations of the first ranking table indicates that the first candidate storage resource configuration has a higher performance and a higher cost than the second candidate storage resource configuration.

In accordance with another aspect of the invention is a non-transitory computer readable medium comprising code stored thereon that, when executed, performs a method of provisioning storage for a logical device comprising: receiving at least one capability profile identifying a first set of one or more storage resource configurations, wherein each storage resource configuration of the first set is a current storage resource configuration supported on a data storage system; receiving a request to provision storage for the logical device, the request including a policy profile identifying a second set of one or more storage resource configurations, wherein each storage resource configuration of the second set is a requested storage resource configuration acceptable for provisioning storage for the logical device; determining a third set of zero or more storage resource configurations, said third set being a set intersection of the first set and the second set; determining whether the third set includes at least one storage resource configuration; and if it is determined that the third set includes at least one storage resource configuration, selecting one of the at least one storage resource configurations of the third set and provisioning storage of the logical device in accordance with the selected one storage resource configuration of the third set. The method may include determining whether the third set includes zero storage resource configurations thereby indicating that no storage resource configuration of the first set supported by the data storage system matches a requested storage configuration of the second set; if the third set includes zero storage resource configurations, performing first processing to select a first storage resource configuration of the first set in accordance with one or more usage criteria, said first storage resource configuration determined by the first processing to be a best configuration of the first set to use for provisioning storage for the logical device in accordance with the one or more usage criteria; and provisioning storage of the logical device in accordance with the selected first storage resource configuration of the first set. Determining a third set of zero or more storage resource configurations that is a set intersection of the first set and the second set may include receiving a ranking table including rows of candidate storage resource configurations ranked in accordance with the one or more usage criteria, each row of the ranking table identifying a different candidate storage resource configuration; expressing the first set of storage resource configurations as a first set of one or more rows of the ranking table; expressing the second set of storage resource configurations as a second set of one or more rows of the ranking table; and determining what one or more rows, if any, in the first set of one or more rows match any row in the second set of one or more rows of the ranking table. The rows of the ranking table may be ranked in priority order, from highest to lowest priority, in accordance with a priority ordering of capabilities and, for each of the capabilities, a priority ordering of associated values for said each capability, wherein the priority ordering of the capabilities and the priority ordering of associated values for each of the capabilities is in accordance with the one or more usage criteria.

In accordance with another aspect of the invention is a system comprising: a processor; and a memory comprising code stored therein that, when executed, performs processing comprising: receiving at least one capability profile identifying a first set of one or more resource configurations, wherein each resource configuration of the first set is a currently supported resource configuration of the system; receiving a request to provision resources of the system, the request including a policy profile identifying a second set of one or more storage resource configurations; determining a third set of zero or more resource configurations, said third set being a set intersection of the first set and the second set; determining whether the third set includes at least one resource configuration; and if it is determined that the third set includes at least one resource configuration, selecting one of the at least one resource configurations of the third set and provisioning resources for the request in accordance with the selected one storage resource configuration of the third set. The processing may include determining whether the third set includes zero resource configurations thereby indicating that no resource configuration of the first set matches a requested configuration of the second set; if the third set includes zero resource configurations, performing first processing to select a first resource configuration of the first set in accordance with one or more usage criteria, wherein said first resource configuration is determined by the first processing to be a best configuration of the first set to use for provisioning resources for the request in accordance with the one or more usage criteria; and provisioning resources for the request in accordance with the selected first resource configuration of the first set. Determining a third set of zero or more resource configurations that is a set intersection of the first set and the second set may include receiving a ranking table including rows of candidate resource configurations ranked in accordance with the one or more usage criteria, each row of the ranking table identifying a different candidate resource configuration; expressing the first set of resource configurations as a first set of one or more rows of the ranking table; expressing the second set of resource configurations as a second set of one or more rows of the ranking table; and determining what one or more rows, if any, in the first set of one or more rows match any row in the second set of one or more rows of the ranking table.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example of a ranking table representing candidate resource configurations in an embodiment in accordance with techniques herein;

DETAILED DESCRIPTION OF EMBODIMENT(S)

Figure 1:
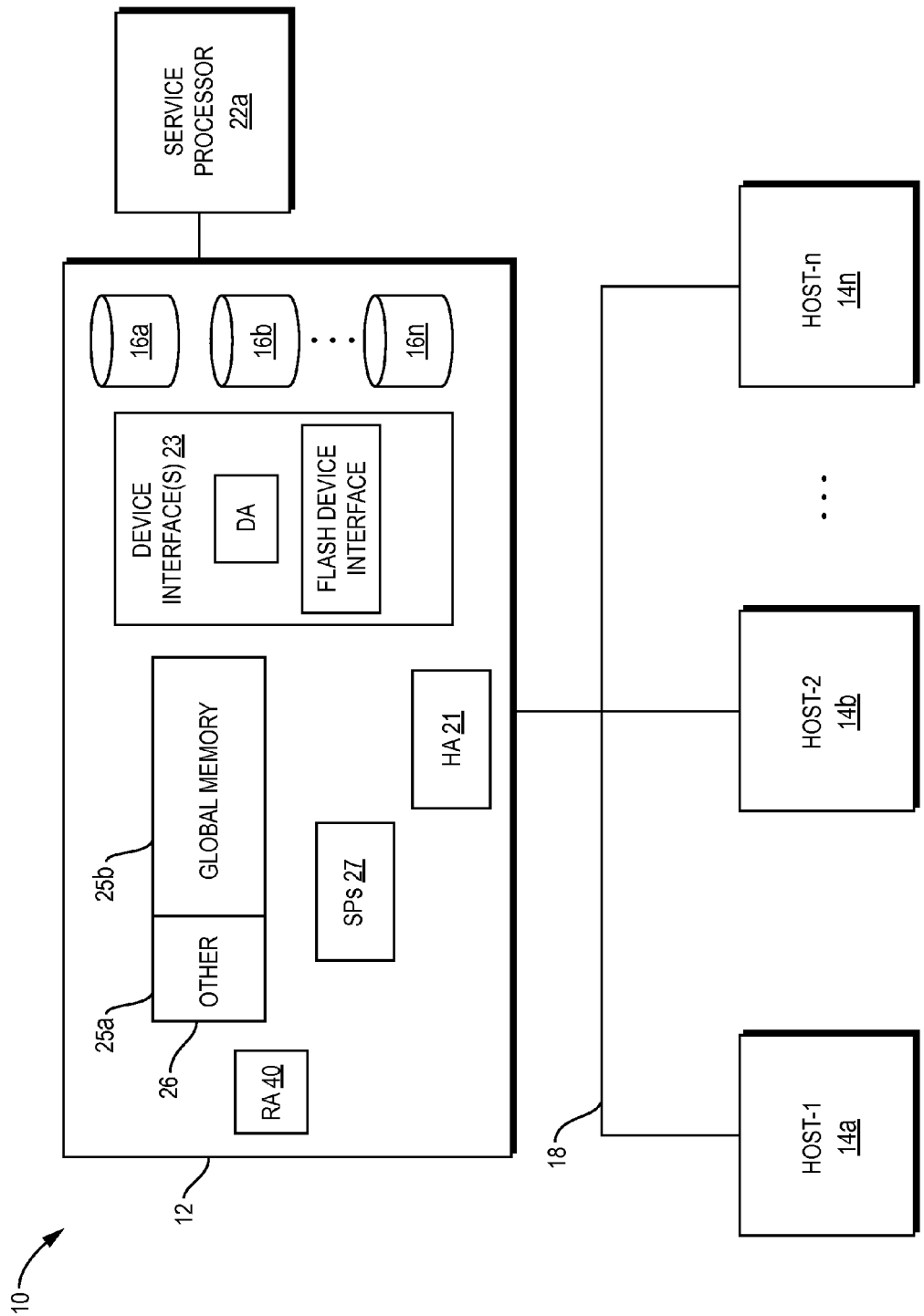
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21 and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n, In the following description, data residing on a LUN may be accessed by the device interface following a data request in connection with I/O operations that other directors originate. For example, a host may issue an I/O operation which is received by the HA 21. The. I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA21, DA or disk interface, RA, and the like, may be implemented as a hardware component including, for example, one or more processors, one or more forms of memory, and the like. Code may be stored in one or more or the memories of the component for performing processing.

Figure 2:
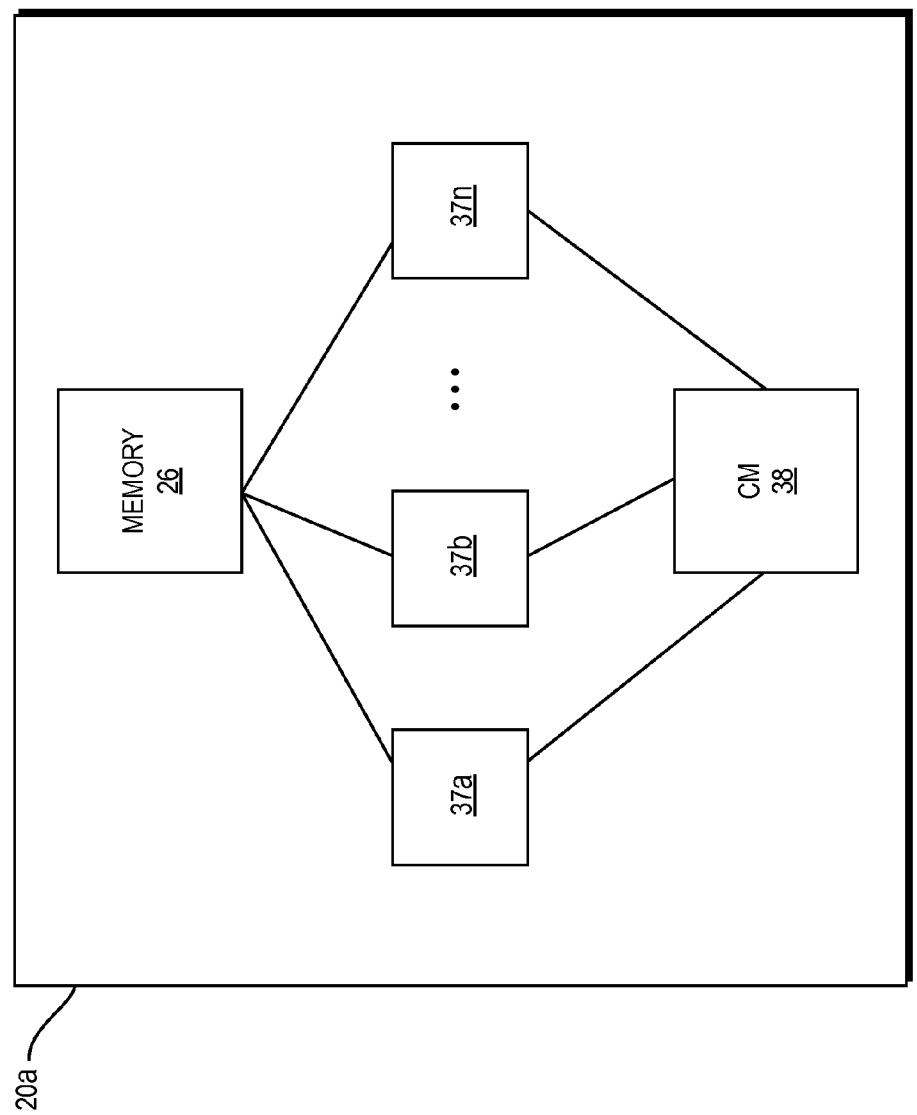
FIG. 2 is a representation of the logical internal communications between the directors and memory in an embodiment of a data storage system in accordance with techniques herein.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. In connection with performing I/O operations, such as writes as well as reads, a data storage system in an embodiment in accordance with techniques herein may use a cache in order to improve performance. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNX® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. In the foregoing data storage array, the data storage devices 16a-16n may include a combination of disk devices and flash devices in which the flash devices may appear as standard Fibre Channel (FC) drives to the various software tools used in connection with the data storage array.

The data storage environment for the data storage system 12 may define multiple storage tiers in which each tier includes physical devices or drives of varying technologies. The physical devices of a data storage system, such as a data storage array, may be used to store data for multiple applications. An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD (solid state drive such as a flash drive), a particular type of SSD drive (such using flash or a form of RAM), a type of magnetic rotating disk drive or other non-SSD drive (such as an FC disk drive, a SATA (Serial Advanced Technology Attachment) drive, SAS, NL-SAS), and the like. Data protection may specify a type or level of data storage protection such, for example, as a particular RAID (redundant array of independent disks) level (e.g., RAID1, RAID-5 3+1, RAID5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives.

A RAID group and various RAID configurations are known in the art. A RAID group configuration uses multiple physical devices to provide a combination of fault tolerance and/or improved performance for data storage devices. For example, a RAID-5 group includes multiple PDs and provides protection from a single PD failure with block level striping and distributed parity information, and RAID-6 provides protection from two PDS of the RAID group failing with two sets of distributed parity and block level striping. The particular RAID levels described herein are merely exemplary and not a limitation of the techniques described herein.

An embodiment in accordance with techniques herein may use a multi-tiered data cache such as FAST Cache in a data storage system by EMC Corporation. In such an embodiment, FAST Cache is an additional caching tier of flash storage used in a data storage system. The flash-based caching tier of FAST Cache is a large capacity secondary cache that uses EFDs positioned between a primary data cache, such as a DRAM cache, and physical storage devices. FAST Cache achieves better system performance by extending the primary data cache by copying frequently accessed data to the FAST Cache. In one embodiment, the FAST Cache may have capacities in the range of 100 GB to 2 TB which may be considerably larger than a DRAM cache used as the primary data cache. If a particular data portion is accessed frequently, it may be promoted to FAST Cache by copying it from physical storage, such as a rotating disk drive, to the FAST Cache.

It should be noted that in an embodiment also having FAST enabled with a flash storage tier, or more generally, an embodiment with a data storage optimizer performing automated storage tiering that is enabled with a flash storage tier, data currently stored on a flash tier is not promoted to FAST cache because such data already resides on flash drives of the storage tier.

In an embodiment having multiple storage tiers, techniques may be performed for automated storage tiering and data movement between different storage tier, such as may be performed by a data storage optimizer, to improve data storage system performance. For example, the Fully Automated Storage Tiering (FAST) product produced by EMC Corporation of Hopkinton, Mass., provides such automated movement of data between different storage tiers to optimize use of the different storage tiers including the ability to easily create and apply tiering policies (e.g., allocation policies, data movement policies including promotion and demotion thresholds, and the like) to transparently automate the control, placement, and movement of data within a storage system based on business needs. A data storage optimizer, multi-tiered storage and automated tiering is described, for example, in U.S. Pat. No. 8,583,838, Techniques for Statistics Collection in Connection with Data Storage Performance, Nov. 12, 2013, which is incorporated by reference herein. In such a multi-tiered storage environment, each of the different storage tiers may include different PDs having different performance characteristics. For example, a multi-tiered storage system may include a first tier of rotating disk drives and a second tier of flash memory-based PDs. In such an environment where data that is promoted or placed into the second tier, techniques herein may be used to select a particular one PD of the second tier upon which to store the data.

Techniques herein may be used in an embodiment having thin or virtually provisioned logical devices. A thin device is a type of logical device where units of storage are progressively allocated on an as-needed basis. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

An embodiment in accordance with techniques herein may provide for logical devices that are thin or virtually provisioned devices along with thick logical devices. A thick device may be characterized as a regular logical device presented as having a particular storage capacity where physical storage is provisioned (allocated or bound) for the entire storage capacity when the thick device is configured.

In one embodiment in accordance with techniques herein, virtual machines (VMs) may execute in a virtualized environment where the VMs may access and use data stored on logical devices also referred to herein as virtual volumes. For example, an embodiment may have one or more VMs executing on a single physical machine in a virtualized environment using virtualization software, such as vSphere™ from VMware, Inc. In the context of each VM, one or more applications may be executed, where the applications may include any one or more of, for example, an email server application such as Microsoft Exchange Server (MES), a web server, or a database server application. The VMs may execute, for example, on one or more hosts. Each VM may access and use data stored on one or more virtual volumes having physical storage provisioned on a data storage system.

Figure 3:
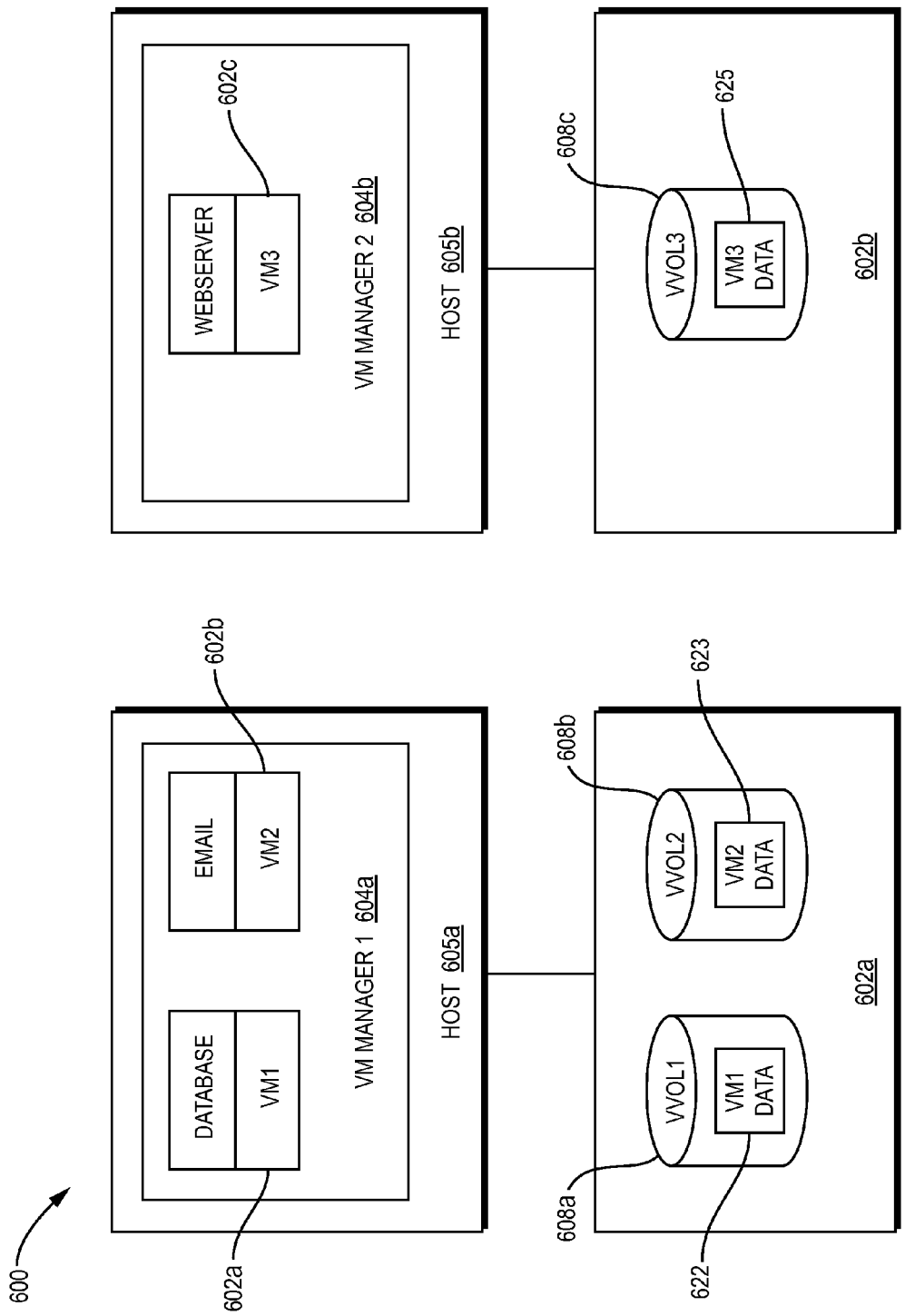
FIG. 3 is an example of data storage systems and hosts including virtual machines in an embodiment in accordance with techniques herein.

Referring to FIG. 3, shown is an example 600 that includes VM1 602a and VM2 602b managed by VM manager 1 604a and VM3 602c managed by VM manager 2 604b. Each of 604a, 604b may be a hypervisor that performs VM management in connection with multiple VMs such as VMware ESX Server. Such a hypervisor may be installed and run directly on server hardware without requiring an underlying operating system. Each of the VM managers 604a, 604b may perform management of the underlying server's physical resources for use among the multiple VMs that can run simultaneously. In this example, a database application is executed by VM1 602a, an email application is executed by VM2 602b and a webserver is executed by VM3 602c. VM manager 1 604a may execute on a first host 605a and VM manager 2 604b may execute on a second host 605b. Elements 602a, 602b may each be a data storage system. Data storage system 602a may include physical storage provisioned for use with VVOLs 1 and 2 (virtual volumes 1 and 2) 608a, 608b. Data storage 602b may include physical storage provisioned for use with VVOL3 608c. VMs 602a-b of host 605a may access and use data stored on VVOL1 608a and VVOL2 608b. VM 602c of host 605b may access and use data stored on VVOL3 608c.

Data used by a VM that is stored on a VVOL may include data used by the particular application executing on the VM (e.g., database data and log files for a database application executing on a VM such as VM1 602a) as well as VM metadata regarding its state, configuration, and execution context such as, for example, data stored in memory, CPU registers, swap files, log, files, and the like.

VVOLs may be provisioned by a data storage administrator, such as a virtualization administrator. Described in following paragraphs are techniques that may be used in connection with provisioning storage for VVOLs. Such techniques provide for policy based provisioning of physical storage for VVOLs. More generally, such techniques may be used in connection with policy based provisioning for any suitable data storage system resource, such as for other logical device, used by any suitable consumer of data storage system resources. In one embodiment, techniques described in following paragraphs may be embodied in an application programming interface (API) whereby one or more API calls may be made as requests to the data storage system to provision storage for a logical device.

It should be noted that although embodiments described herein may refer to VMWare and its virtualization environment, more generally, techniques herein for policy based provisioning may be extended for use with other virtualization environments of any suitable vendor. Even more generally as noted above, techniques herein for policy based provisioning may be used in connection with other suitable environments to provision physical storage and other data storage system resources for a logical device.

As mentioned above, a virtualization environment vendor, such as VMware, may allow data storage system vendors to integrate with the virtualization environment by providing an API used to configure and provision physical storage for a VVOL (which is a particular type of logical device used by a VM). Using the API, a request may be issued with parameters to create a VVOL and provision storage for the VVOL. Such parameters may specify different requested options for one or more VVOLs being created. Such options may include, for example, the type of PD or storage tier from which storage is provisioned for the VVOL, the RAID configuration and/or level (e.g., RAID-5, RAID-6, RAID-1, RAID-10), whether automated storage tiering is enabled, whether FAST cache is enabled for storing data of the VVOL, whether the VVOL can be a thick or thin logical device, and the like. The foregoing are described in more detail below. In an embodiment described herein, the foregoing parameters, also referred to as capabilities described elsewhere herein, may be specified in a storage policy profile, also referred to as a policy profile. The policy profile may be included, along with other information, in the API call that is a request to provision storage for a VVOL. Thus, a policy profile may generally specify capabilities of storage system resources that are requested for use with provisioning storage for the requested VVOL.

In an embodiment in accordance with techniques herein, a storage capability profile, also referred to as a capability profile, may be used to express the capabilities of the data storage system that are exposed or available for use when configuring and provisioning storage for a VVOL, such as using the API with a policy profile as described herein.

The capability profile and policy profile may be expressed using capabilities and constraints associated with the capabilities. A capability may be characterized as a parameter of a storage system configuration such as Drive Type (e.g., NL-SAS, SAS, etc.), RAID Type (e.g., RAID-10, RAID-5, RAID-6 etc.), and the like. Capability metadata may be characterized as a set of capabilities supported by a storage system along with sets or ranges of supported values for each capability. A constraint may be a set or range of values supported or requested for a particular capability for a particular storage system configuration. Thus, generally, a capability profile identifies the various storage resource configurations and options of resources available for provisioning storage (e.g., capabilities and constraints of resources available for provisioning storage), and the policy profile identifies requested storage resource configurations and options of resources when provisioning storage (e.g., capabilities and constraints of resources requested when consuming or provisioning storage). The foregoing profiles, capabilities, and associated values, and examples thereof, are described in more detail in following paragraphs.

As described above, a capability profile may be a set of capabilities along with associated constraints configured by the storage administrator to express supported configuration(s) that may be used to provision storage resources such as for virtualization environments. A policy profile may be a set of capabilities along with associated constraints configured by the virtualization administrator to request required configuration(s) for provisioning of storage resources (e.g. for objects of virtualization environments (e.g. VMs). An embodiment may define and use multiple policy profiles each of which specify different requirements for different uses or applications for which VVOLs may be created.

Figure 4:
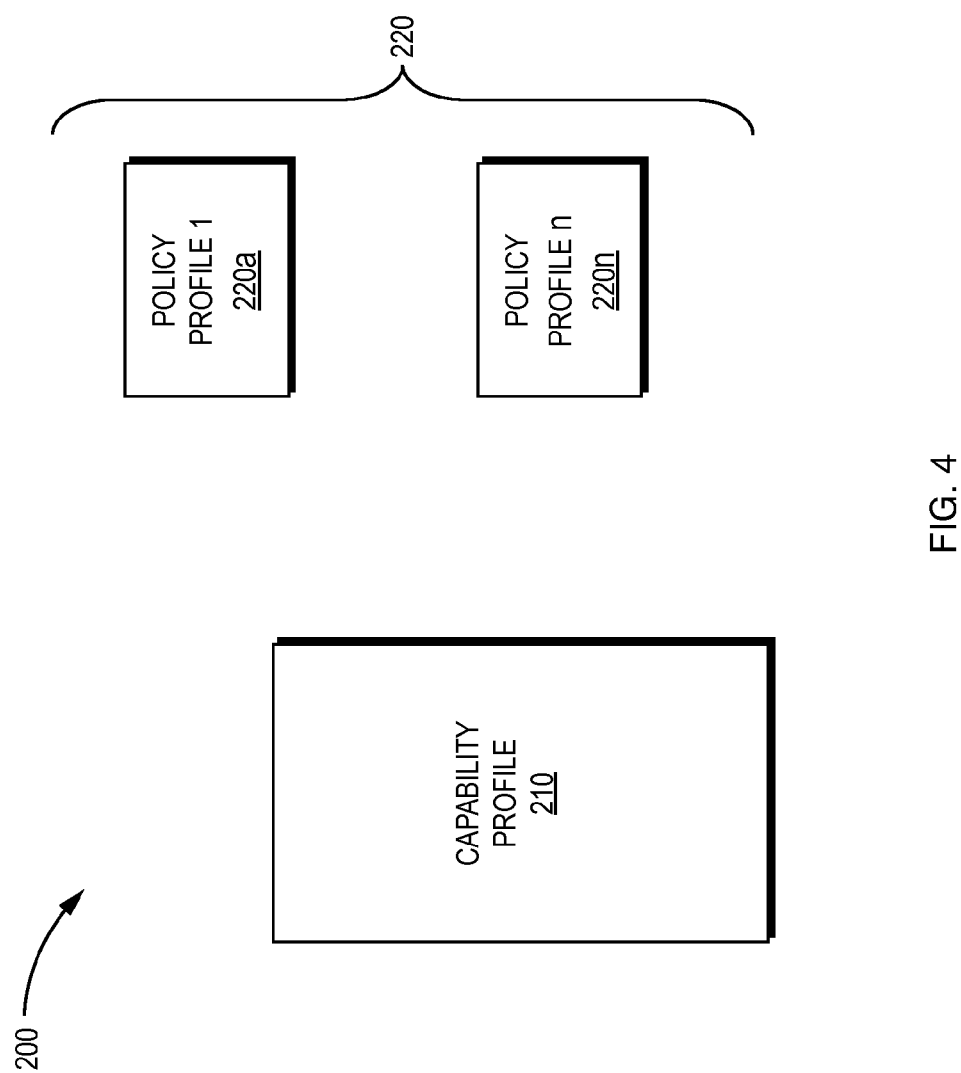
FIGS. 4, 5 and 6 are examples illustrating storage capability profiles and storage policy profiles in an embodiment in accordance with techniques herein.

Referring to FIG. 4, shown is an example illustrating profiles that may be used in an embodiment in accordance with techniques herein. The example 200 includes a capability profile 210 that may identify the capabilities and constraints for a data storage system. Also, the example 200 includes one or more policy profiles 220 each of which specify different requested capabilities and constraints. For example, a first policy profile 220a may be used to specify requirements or requested storage resource options when creating a first set of one or more VVOLs used by a first application. For example, the first application may need a large amount/capacity of cost efficient storage and performance may not be important. Thus, the first policy profile may specify a lowest performance storage tier, such as SATA rotating disk drives. Additionally, since performance is not important, the first policy profile may indicate that thin provisioning is allowed (since thin provisioned devices incur a performance penalty when storage is allocated in response to a first write to a particular LBA) and a RAID type, such as RAID-6, may be used (e.g., RAID-6 incurs performance penalties for I/O operations thereby typically having lower performance than RAID-5 or RAID-1).

A second different policy profile 220n may be used to specify requirements or requested storage resource options when creating a second set of one or more VVOLs used by a second application. Performance may be critical to the second application and therefore the second policy profile 220n may specify that a high performance storage tier, such as flash storage or a high performance rotating disk drive, is needed. Additionally, the second policy profile 220n may require thick device provisioning, a RAID-1 or RAID-5 configuration, and FAST cache if storage is provisioned from a rotating disk drive/tier rather than flash storage.

It should be noted that a capability and associated constraint may also be expressed as a performance parameter, such as IOPS (I/Os per second), access time, and the like whereby the capability profile and/or policy profile may specify a range of values for the performance parameter. For example, a policy profile may specify a required or desired level of performance, such as a number of IOPS, of the physical storage provisioned for one or more VVOLs. It should be noted that such a performance parameter and associated value specifying a required level of IOPS may be specified rather than, or in addition to, other capabilities, such as rather than specify a particular storage tier or type of PD.

A policy profile may include all or some of the capabilities that may be exposed by a data storage system in its capability profile. For example, the data storage system may have an associated capability profile 210 which specifies 6 different capabilities. A policy profile may completely (e.g., for all 6 capabilities) or partially (e.g., less than 6 capabilities) specify capability requirements. For example, a policy profile may specify capability requirements for only a single capability. More generally, the policy profile may specify capability requirements related to any one or more identified capabilities exposed by a data storage system whereby the identified capabilities may be included in the capability profile of the data storage system. To further illustrate, a data storage system may support 6 capabilities as noted above. Thus, a capability profile for the data storage system may include all 6 capabilities with constraints identifying different values for supported configurations in the data storage system. A virtualization administrator may analyze requirements for storage to be provisioned for a particular application and determine that only 2 particular capabilities are important for storage provisioned for the application. Thus, the virtualization administrator may create a policy profile for VVOLs used by the particular application where the policy profile only specifies requirements for the 2 capabilities of importance. Such a policy profile may be characterized as a partially specified policy profile.

It should be noted although the example 200 includes only a single capability profile, if there are multiple data storage systems with different exposed capabilities from which storage may be provisioned, an embodiment may include a different capability profile for each such data storage system and each set of associated exposed capabilities of the data storage system.

Figure 5:
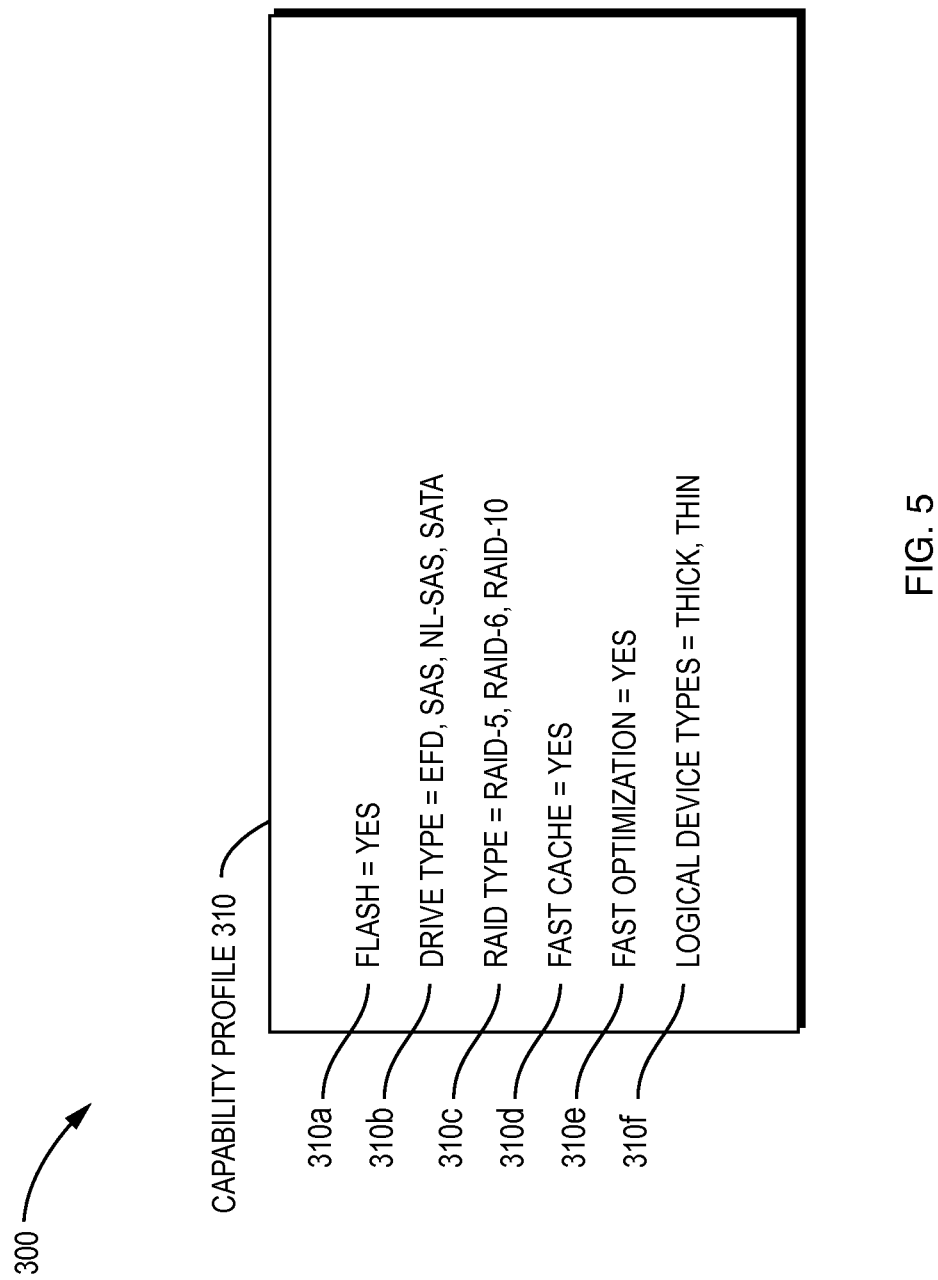

Referring to FIG. 5, shown is an example 300 illustrating in more detail information that may be included in a capability profile. The capability profile 310 may include the following identifying details regarding the characteristics of storage resources available when provisioning storage for a logical device such as a VVOL:

line 310*a* identifying that storage resource configurations for provisioning may include flash-based storage;

line 310*b* identifying that drive types of EFD, SAS, NL-SAS, and SATA are available for provisioning;

line 310*c* identifying that RAID groups having types of RAID-5, RAID-6 and RAID-10 are available for provisioning;

line 310*d* identifying that FAST cache may be enabled for a logical device having its storage provisioned;

line 310*e* identifying that use of a data storage optimizer, such as embodying functionality like that of the FAST product described herein, may be enabled to automatically relocate data portions of the logical device between different storage tiers; and line 310*f* identifying that a logical device may be provisioned as either a thick or thin logical device.

It should be noted that in at least one embodiment, one or more of the capabilities illustrated in FIG. 5 may not be exposed as a capability parameter or option. For example, in one embodiment, although use in connection with techniques herein, the capability options of lines 310*a* and 310*e* may not be exposed as configurable or selectable options by a user in a policy profile and thus may also not be exposed in the capability profile. The flash parameter of line 310*a*, for example, may alternatively be inferred from whether one or more other capabilities are included in a configuration such as drive type, FAST cache, FAST optimization, and the like.

Generally, the example 300 illustrates 6 different capabilities that may be exposed by a data storage system each having different possible constraints or values. Assuming the same 6 capabilities and capability profile of FIG. 5, reference is now made to FIG. 6 to further illustrate two different policy profiles that may be specified for use with the capability profile of FIG. 5.

Additionally, it should be noted an embodiment may also specify multiple capability profiles for a single data storage system rather than a single capability profile such as 310. For example, an embodiment may specify 3 capability profiles for a single data storage system where each such capability profile may specify a finer granularity of capabilities since the multiple possibilities of combinations of different capabilities illustrated by the example 300 may not be configured in a data storage system. For example, rather than specify a single capability profile as in the example 300, an embodiment may specify the following 3 capability files for the single data storage system:

Capability file 1: Drive type=EFD, RAID type=RAID-10, FAST Cache=No, . . .

Capability file 2: Drive type=SAS, RAID type=RAID-5, FAST Cache=Yes, . . .

Capability file 3: Drive type=NL-SAS, RAID type=RAID-6, FAST Cache=No, . . .

Figure 6:
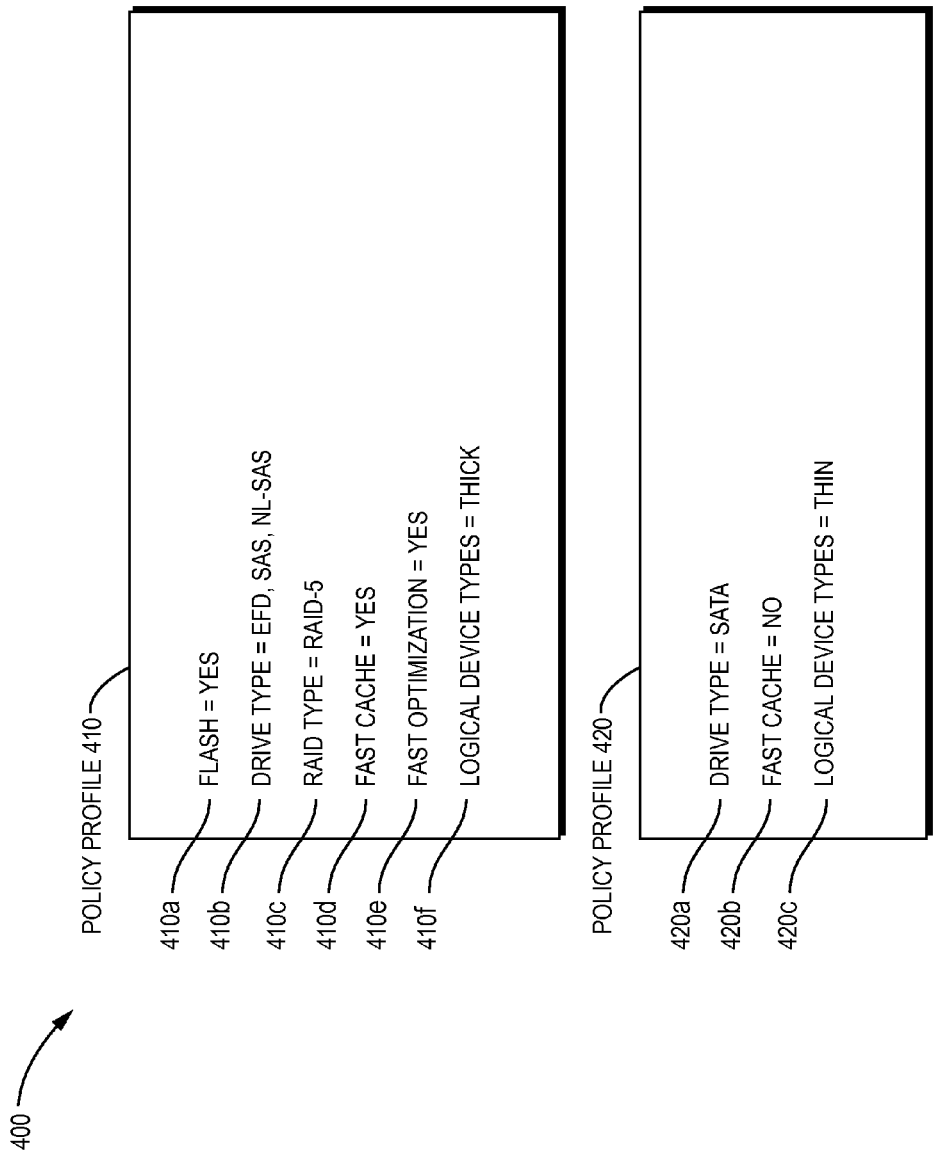

Referring to FIG. 6, shown are examples 400 illustrating in more detail information that may be included in a policy profile. Element 410 is a first example of information that may be included in a policy profile. For example, policy profile 410 may be specified for a critical performance application such as the second application mentioned above in connection with FIG. 4. The policy profile 410 may include the following identifying details regarding the requested characteristics of storage resources when provisioning storage for a logical device such as a VVOL:

line 410*a* indicating that storage resource configurations for provisioning include flash-based storage;

line 410*b* identifying that any of the drive types of EFD, SAS and NL-SAS, be used for provisioning storage;

line 410*c* identifying that storage is to be provisioned from a RAID-5 group;

line 410*d* identifying that FAST cache is to be enabled (if the drive type from which storage is provisioned is not EFD);

line 410*e* identifying that the data storage optimizer, such as embodying functionality like that of the FAST product described herein, is to be enabled to automatically relocate data portions of the logical device between different storage tiers; and line 410*f* identifying that the logical device be provisioned as a thick logical device.

Element 420 is a second example of information that may be included in a policy profile. For example, policy profile 420 may be specified for an application where cost is more important than performance (e.g., where performance is not critical). The policy profile 420 may be used, for example, to provision storage for VVOLs for use with the first application mentioned above in connection with FIG. 4. The policy profile 420 may include the following identifying details regarding the requested characteristics of storage resources when provisioning storage for a logical device such as a VVOL:

line 420*a* indicating that a SATA drive type is to be used for provisioning storage;

line 420*b* indicate that FAST cache is not to be enabled; and line 420*c* indicating that the logical device is to be provisioned as a thin or virtually provisioned device.

It should be noted that the policy profile 420 only specifies 3 capabilities and associated constraints since, in this example, these may the only capabilities of importance when provisioning storage for a particular application.

Based on the above, a policy match may be defined where a capability profile matches a particular policy profile. With such a policy match, the capability profile includes all capabilities referenced by the matching policy profile and constraints for each of the capabilities specified by the policy profile match or otherwise overlap with constraints for corresponding capabilities in the capability profile. In this case the storage having an associated configuration as expressed by the capability profile matches characteristics of the storage requested by the matching policy profile.

To allow the storage administrator flexibility of the storage system configuration, an embodiment in accordance with techniques herein may allow the storage administrator of the data storage system to select some set of capabilities that are exposed in a capability profile. The storage administrator may also be allowed to specify constraints for those capabilities within limits that follow from the actual installed storage system hardware and configuration. Given that the storage administrator may have freedom to compose storage capability profiles and the virtualization administrator will have freedom to compose storage policy profiles (including the possibility of an empty storage policy profile or inclusion), the following may result when a request is made to provision storage for a VVOL using a storage policy profile:

a) The storage policy profile matches at least one of the storage capability profiles of the data storage system(s) from which storage can be provisioned.

b) The storage policy profile does not match any of the storage capability profiles of the data storage system(s).

c) The storage policy profile does not match any of the storage capability profiles of the data storage system(s). However, the storage system may be further requested by the virtualization environment to provision storage for the VVOL using a "best match" to one of the available configuration of one of capability files.

d) The storage policy profile is not provided (e.g., empty) and it is necessary to provision the VVOL, based on a specified default.

Generally, each possible candidate storage system resource configuration may be expressed using N capabilities (N being a positive integer) so that each such configuration is a point in N-dimensional space (e.g., where the N capabilities represent the different N axes). The capability profiles and policy profiles may each correspond to an area in the N-dimensional space and a match between a capability profile and a policy profile may also be viewed as an N-dimensional space area that is an intersection of a first area of the capability profile and a second area of the policy profile. The foregoing is a general and theoretical expression of processing that may be performed in an embodiment in accordance with techniques herein to determine a storage resource configuration used when provisioning storage for a requested VVOL.

As a practical implementation of the foregoing general expression, an embodiment in accordance with techniques herein will now be described to efficiently search the capability profile and identify a supported resource configuration, if any, that matches a requested configuration specified in the policy profile.

In accordance with techniques herein, all N capabilities may be ranked in order of importance or, more generally, based on one or more ranking criteria associated with the storage system resources. In one exemplary embodiment, the storage system may expose up to 6 different capabilities. (e.g., N=6) ranked in the following order of priority, from highest to lowest priority:

Whether flash storage is used

Drive Type

RAID Type

FAST Cache

Data storage optimization performed with fully automated storage tiering and data movement between storage tiers Space Efficiency (Thin vs thick logical device allocation)

For each of the foregoing 6 capabilities, associated values that may be specified as constraints are also ranked in the order of priority. Using the foregoing two rankings allows processing to rank all possible storage resource configurations.

An embodiment in accordance with techniques herein may thus perform a first step as just described that includes specifying a prioritized order or ranking of importance of all the different 6 capabilities that may possibly be included in a capability profile, and also specifying a prioritized order or ranking of importance for the possible values for each such capability.

A second step may be performed to generate a ranking table of all possible candidate storage resource configurations based on the N=6 possible capabilities and associated constraint values. The ranking table may also be referred to herein as a configuration table of different candidate storage resource configurations with a row of the table for each of the different candidate storage configurations. Collectively, all possible candidates expressed in all rows of the table may denote the entire set of candidate storage resource configurations. Thus, each possible candidate storage resource configuration is represented in the table as a single row of different constraint values for all the different capabilities.

Referring to FIG. 7, shown is an example 500 of a configuration table including ranked rows each representing a different storage resource configuration candidate that may be used in an embodiment in accordance with techniques herein. The example 500 illustrates an exemplary ranking table of ranked storage resource configurations based on the N=6 capabilities described above. Each row of the table represents a different candidate storage resource configuration. The table 500 includes rows ranked in priority order, from highest priority to lowest priority, thereby ranking the possible candidate storage resource configurations. The ranking of rows in 500 is based on the prioritized order or ranking of importance of the capabilities and also, for each capability, the prioritized order or ranking of importance of the possible values of the capability from the first step.

It should be noted that an embodiment may use multiple instances of the ranked configuration table 500 whereby each such instance may be ranked based on the particular one or more criteria that is most important for different usages of a logical volume, such as a VVOL, being configured and having its storage provisioned. In this case, an embodiment may repeat the above-mentioned first step of ranking the 6 capabilities and, for each capability, associated values for each such ranked configuration table. For example, as described elsewhere herein, one of three different VVOL types may be specified identifying the VVOL as a VM swap device, a VM configuration device (e.g., used to store VM configuration data), and a data device (e.g., for storing data used by an application running on the VM). An embodiment in accordance with techniques herein may create 3 ranked configuration tables each ranking the possible configurations based on one or more criteria of importance for a different VVOL type. As noted elsewhere herein, for the swap device VVOL type, performance may be most important so the above-mentioned first step of ranking the 6 capabilities and, for each capability, associated values may be performed whereby the higher the performance of a configuration, the higher the associated ranking priority. For the swap device VVOL type, a first ranked configuration table may include the possible configuration of the table 500 ranked with the highest priority assigned to the configuration having the fastest performance storage (e.g., ranked from highest to lowest in terms of associated performance with higher/highest priority for the configurations having the highest performance). The table 500 illustrates the ranked configuration table instance that may be used for a swap device VVOL type.

For the configuration device VVOL type, lowest cost may be most important so the above-mentioned first step of ranking the 6 capabilities and, for each capability, associated values may be performed whereby the lower the cost of a configuration, the higher the associated ranking. For the configuration device VVOL type, a second ranked configuration table may include a ranking different from that of the table 500 with the highest priority assigned to the lowest cost configuration (e.g., ranked from highest to lowest in terms of associated cost with lowest/lower cost configurations being ranked at a higher priority than other configurations with higher costs). For the second ranked configuration table, for example, the rows may have ranking the opposite of the example 500 whereby row 40 of the table 500 may be ranked first in this second ranked configuration table and row 1 may be ranked last in this second ranked configuration table.

For the data device VVOL type, it may be desired to have a more balanced approach or more equal priority weight of both cost and performance. Thus, such an embodiment may perform the above-mentioned first step of ranking the 6 capabilities and, for each capability, associated values whereby the more balanced a configuration is with respect to cost and performance, the higher the associated ranking. Based on such a ranking, an embodiment include yet a third ranked configuration table ranked based on an equal weighting of cost and performance. For the third ranked configuration table, for example, the rows may have ranking with those configurations include SAS and RAID-5 at the top/ranked highest priority and the configurations which are more extreme, such as having the highest performance (e.g., all EFD) or lowest cost (e.g., all NL-SAS), ranked at the bottom with the lowest priority.

Thus, in such an embodiment, the foregoing 3 ranked tables may be created each including the same configurations which may be ranked differently based on the different ranking of one or more criteria for the particular VVOL type. As described in more detail elsewhere herein, a particular one of the 3 ranked tables may be selected for use in connection with techniques herein depending on the VVOL type specified on a particular request. In this manner, the highest ranked rows appear at the top of each of the 3 tables for different possible usages based on VVOL type. As described in more detail below, having tables so ordered facilitates selection of a configuration from one of the tables in accordance with one or more usage criteria where the selected configuration has a corresponding row in the one table that is closest to the top of the table.

The table 500 includes the following columns: rank 502, flash 504 (denoting whether flash-based storage is used in the configuration), drive type 506 (denoting the one or more drive types of the one or more types of physical storage device used in the configuration), RAID type 508 (denoting the one or more RAID group types used in the configuration), FAST Cache 510 (denoting whether FAST cache is on/enabled or off/disabled), FAST VP 512 (denoting whether data storage movements and optimizations such as performed by the FAST product by EMC Corporation are performed/enabled), and space efficiency 514 (denoting whether storage for the logical device is provisioned based on thin or thick logical device provisioning). Column 502 denotes the ranking or priority ordering where the lower the rank in column 502, the higher the priority. For example, row 1 identifies the highest ranked configuration and row 40 identifies the lowest ranked configuration. Columns 504, 506, 508, 510, 512 and 514 collectively identify the 6 capabilities with values or constraints specified in different cells of the table for the particular configuration. Thus, each configuration is represented as a row of the table where the row includes a set of constraints for the 6 capabilities for that particular configuration.

It should be noted that table 500 of FIG. 7 is the first ranked configuration table described above and elsewhere herein. The highest ranked resource configuration candidate (as represented by row 1) is the most expensive and fastest/highest performance of all configurations in the table. Generally, the ranking of rows is from a highest priority or order to a lowest priority or order whereby a first row ranked higher than a second row means that the first row is associated with a storage configuration that is faster/better performing and more expensive than a storage configuration associated with the lower ranked second row. The lower the rank number, the higher the rank of the represented configuration. The higher the ranking of a row and represented configuration, the more expensive per GB the storage resources and also the greater the expected performance (e.g., such as in terms of IOPS). As noted above, the table 500 is an example of a ranked configuration table based on the ranking where performance is more important than cost and the higher the performance, the higher the ranking priority in the table 500 such as may be used for the swap device VVOL type. The second and third ranked configuration tables noted above may include the rows of the table 500 reordered for the particular priority based, respectively, on the usage as a configuration device VVOL type and a data device VVOL type.

With reference to the table 500, flash 504 may be either yes (denoting that the represented configuration includes flash-based storage as either a drive type/provisioned storage or as FAST Cache) or no (denoting that the represented configuration includes flash-based storage).

Drive type 506 may be any of:

EFD (denoting that the configuration represented only includes EFD storage provisioned), Extreme MT (denoting that the configuration includes multiple storage tiers of both flash and rotating hard disk drives. For example, in one embodiment, Extreme MT may denote a configuration including one or two tiers of rotating physical disk drives and a flash tier.), Multitier (denoting that the represented configuration includes multiple tiers of rotating physical disk drives but no flash tier. For example, MULTITIER may denote a configuration of two tiers of rotating drives, but no flash tier.), SAS (denoting that the configuration includes only SAS rotating disk drives), and NL-SAS (denoting that the configuration includes only NL-SAS rotating disk drives).

RAID type 508 may be any of:

RAID-10 (denoting that the configuration includes only RAID-10 groups),

RAID-6 (denoting that the configuration includes only RAID-6 groups),

RAID-5 (denoting that the configuration includes only RAID-5 groups), and

MIXED (denoting that the configuration includes multiple RAID group types such as both RAID-6 and RAID 10 and possibly others such as RAID-5 and/or RAID-1).

FAST Cache 510 may be either off (indicating no FAST caching is not performed/disabled in the configuration represented) or on (indicating that FAST caching is enabled in the configuration represented).

FAST VP 512 may be any of:

N/A (not applicable because there is only a single storage tier in the configuration represented), Highest (indicating that FAST data storage optimizations are performed for automated storage tiering and data for the provisioned logical device is always stored in the highest performing storage tier (e.g., flash) in the represented configuration), Lowest (indicating that FAST data storage optimizations are performed for automated storage tiering and data for the provisioned logical device is always stored in the lowest performing storage tier in the represented configuration).

Autotier (indicating that FAST data storage optimizations are performed for automated storage tiering and data portions of the provisioned logical device are automatically relocated or moved between storage tiers as appropriate based on the activity or workload directed to the different data portions), and AutotierHigh (indicating that FAST data storage optimizations are performed for automated storage tiering and data portions of the provisioned logical device are initially stored on the highest possible performance storage tier and then automatically relocated or moved between storage tiers as appropriate based on the activity or workload directed to the different data portions. This provides an advantage in that such a data portion which may have a very heavy I/O workload does not experience an initial period of poor performance until the data storage optimizer relocates the data portion to the highest such performance tier).

As a third step, processing may include receiving a capability profile and performing processing to express the capability profile as a first set of one or more rows of the ranking table(s). In other words, the capability profile specifies capabilities and constraints as currently supported for the configured data storage system. Thus, the table 500 may represent all possible storage resource configuration candidates whereby the data storage system may actually be configured to support only a first set (which may be less than all) of such configurations. The first set of supported or actual configurations available in a data storage system may be identified by the capability profile that is translated or mapped to a first set of corresponding rows of the table 500. In this third step, if there are multiple ranked configuration tables such as the 3 ranked configuration tables described above, the third step may include determining, for each of the 3 ranked configuration tables, such a first set of corresponding one or more rows representing supported or configurations actually implemented in a data storage system. It should be noted that each of the 3 ranked configuration tables may include the same represented configurations with rows of each table having a different ranking. Thus, the third step may include determining the rows in each table for the same supported configurations of the data storage system (e.g., corresponding rows and row numbers of each table may differ depending on ranking).

As a fourth step, processing may include receiving a request to create and provision storage for a VVOL. The request may include a policy profile and may also indicate a type of VVOL for which this request is being made. The type specified may be one of a defined set of possible VVOL types such as any of a VM swap device, VM configuration device, or VM data device. Each of the foregoing types may identify a different intended use of the VVOL for which storage is being provisioned via the request. The VM configuration device type may indicate that the VVOL is to be used for storing VM configuration information. The VM swap device configuration type may indicate that the VVOL is to be used as a swap device for a VM. The VM data device type may indicate that the VVOL is to be used for storing data of an application executing in the context of a VM. The foregoing types are described in more detail elsewhere herein. In an embodiment using multiple ranked configuration tables such as the 3 ranked configuration tables described above, the fourth step may also include selecting one of the 3 ranked configuration tables based on the VVOL type and using the associated first set of rows for the selected configuration table as determined from the third step above. As described in more detail elsewhere herein, the VVOL type may also be characterized as denoting one or more usage criteria. Such usage criteria may be that one or more criteria used in ranking (in the first step noted above) the various configurations expressed using the selected ranked configuration table for the particular VVOL type.

As a fifth step, processing may include expressing the policy profile as a second set of one or more rows of the ranking table selected in the fourth step. In other words, in a manner similar to that as performed for the capability profile in the third step above, the policy profile specifies capabilities and constraints that are requested or required for the current provisioning request. Thus, the table 500 may represent all possible storage resource configuration candidates whereby the policy profile may now identify that a second set of such candidate configurations having corresponding rows of the table are now being requested (e.g., such second set of configurations are identified in the policy profile as defining a set of configurations each meeting requested configuration requirements). As with the first set of the third step, the second set may be expressed as rows of the table 500 corresponding to the configurations identified in the policy profile.

Collectively, the second set of rows of the table specified using the policy profile represent acceptable requested resource configuration any of which meet the requested provisioning requirements. (Policy profile may specify multiple possible configurations—identifies capabilities and acceptable value requirements for such capabilities expressed as individual rows of a table).

As a sixth step, processing may include determining a third set of zero or more rows each of which identifies a row of the first set (configuration of the capability profile) that matches a row of the second set (configuration of the policy profile). The third set may be determined as the set intersection of the first and second sets of rows of the ranking table.

As a seventh step, processing may include determining whether the third set/intersection is empty, and if the third set is not empty, selecting one row from the third set where, the one row identifies the "best" matching configuration. It should be noted that the "best" matching configuration may be determined in accordance with one or more usage criteria. In one embodiment described herein, the particular VVOL type (specified on input with the request to create the VVOL) may denote the particular usage criteria for the VVOL. If there is only a single row in the set, that single row is selected. If there is more than one matching row in the set, one row is selected that is determined as the "best" of all the matching configurations based on the one or more usage criteria. In the embodiment described herein, the row selected from the third set or intersection may be the row of the third set that is closest to the top of the particular ranked configuration table selected in the fourth step (e.g., select row from third set/intersection that is ranked as having the highest priority of all rows of the third set where such priority ranking is based on the particular ranked configuration table selected in the fourth step based on VVOL type and the selected row is the row of the third set closest to the top of the particular ranked configuration table for the VVOL type of the request).

In one embodiment as noted above, the VVOL type provided as an input with the provisioning request may be one of: VM swap device, VM configuration device, or VM data device. Based on the VVOL type, usage criterion/criteria can be inferred where the usage denotes whether minimizing price/cost or having higher performance is more important. If the third/intersection set includes multiple rows, a particular one row of the set may be selected whereby the one row is "best" in accordance with the usage criteria.

In one embodiment, the type of VM configuration device may identify that the VVOL is to be used for storing VM configuration information/as a VM configuration device. The VM configuration device is used to store state information regarding the configuration of the VM. For a VVOL having a type of VM configuration device, price/cost may be more important than performance whereby the amount of data stored is expected to be large. For a VM configuration device, it may be desirable to have more storage which is of the lowest possible cost without regard to performance. In this case, in an embodiment using a singled ranked table 500 of FIG. 7, the row of the third set selected may be the lowest ranked priority (e.g., has the highest ranking number of the table) of the third set. In an embodiment having 3 ranked configuration tables as noted above rather than just the single ranked configuration table 500, the above-mentioned second ranked configuration table may be used where rows ranked with highest priority ranked row (e.g., row 1) having the lowest cost. Thus, if the second ranked configuration table is used, the row of the third set selected may have the highest priority ranking closest to the top of the second ranked configuration table.

For a VM swap device, it may be desirable to have the highest or best performance storage device whereby performance is more important than cost. Swapping is a technique generally used in virtual memory management where data is swapped or paged in and out of memory. When data is swapped out of memory, it is stored temporarily on a swap device, such as a rotating disk drive, thereby allowing the memory of the swapped out data to be used for other purposes such as storing other data. In this manner, the memory resource may appear to have a much larger size. Such swapping may be performed in a virtualized computing environment whereby virtual memory management techniques may be used to allocate additional memory to a virtual machine (VM) that has run out of resources. Such virtualization management tactics can improve VM performance and management flexibility. In this manner, data of a first VM may be swapped out and stored temporarily on a swap device specified for that first VM. Subsequently, the swapped out data is swapped back into memory (e.g., read from the swap device into memory for use when executing the first VM). In such cases, it is desirable that the VM swap device be high performance whereby having higher/better performance is more important than have using lower cost storage. In this case, in an embodiment using a single ranked table 500 of FIG. 7, the row of the third set selected when the type specified is VM swap device is the highest ranked priority (e.g., has the lowest ranking number of the table) of the third set. In an embodiment having 3 ranked configuration tables as noted above rather than just a single ranked configuration table, the table 500 also corresponds to the above-mentioned first ranked configuration table that may be used having rows ranked with highest priority ranked row (e.g., row 1) having the highest performance. Thus, if the first ranked configuration table is used, the row of the third set selected may have the highest priority ranking closest to the top of the first ranked configuration table (which also corresponds to the table 500 of FIG. 7).

The VM data device may be used to store data of applications executing in the context of a VM. For a VVOL type of VM data device, it may be desirable to have a balance of both costs performance as mentioned elsewhere herein. In this case, in an embodiment using a single ranked table 500 of FIG. 7, when the type specified is VM data device, the row of the third set selected may be that row of the third set having the best balance between cost and performance. In an embodiment having 3 ranked configuration tables as noted above rather than just the single ranked configuration table 500, the above-mentioned third ranked configuration table may be used where rows ranked with highest priority ranked (e.g., row 1) are characterized as most balanced in terms of cost and performance. Thus, if the third ranked configuration table is used, the row of the third set selected may have the highest priority ranking closest to the top of the third ranked configuration table.

Based on which of the foregoing VVOL types are specified in the request, the usage criteria may be determined whereby it can be inferred whether minimizing cost is more important/critical than having better performance, whether better performance is more important/critical than lower cost, or whether a more balanced approach between cost and performance is desired. In an embodiment using only the single table 500 of FIG. 7, if performance is more important and higher performance is desired based on usage criteria, the highest ranked matching row of the table 500 may be selected from the set. If cost is more important whereby it is desired to minimize cost, the lowest ranked matching row of the table 500 may be selected from the set. In an embodiment using the 3 ranked configuration tables as described above whereby a particular one of the 3 tables is selected in the fourth step based on VVOL type, the row selected may that row of the third set closest to the top of the selected table.

An eighth step may be performed if the third set/intersection of rows of the selected ranked configuration table identified by both the capability profile and the policy profile is empty where the eighth step includes processing that selects a "best" configuration and corresponding row of the table. If the third set/intersection is empty, thereby indicating there is no exact match between a row in the first and second sets, such processing selects one row from the first set where the one row identifies the "best" configuration despite no exact match of a row between the first and second sets.

It should be noted that the foregoing paragraphs describe one way in which an embodiment may select the best configuration despite no exact match of a row between the first and second sets and an embodiment may more generally use any alternative technique to select a suitable configuration and row from the configuration table where the selected row corresponds to a supported configuration of the capability file. The processing set forth in following paragraphs may be performed, for example, using the ranked configuration table selected in the fourth step noted above to select a row from such selected ranked configuration table.

The selected row is specified in the capability profile. Additionally, there is a first distance between the selected row and a second row of the table identified by the policy profile where the First distance is the minimum of all such distances between all rows of the first set and all rows of the second set. This is described in more detail below.

Figure 8:
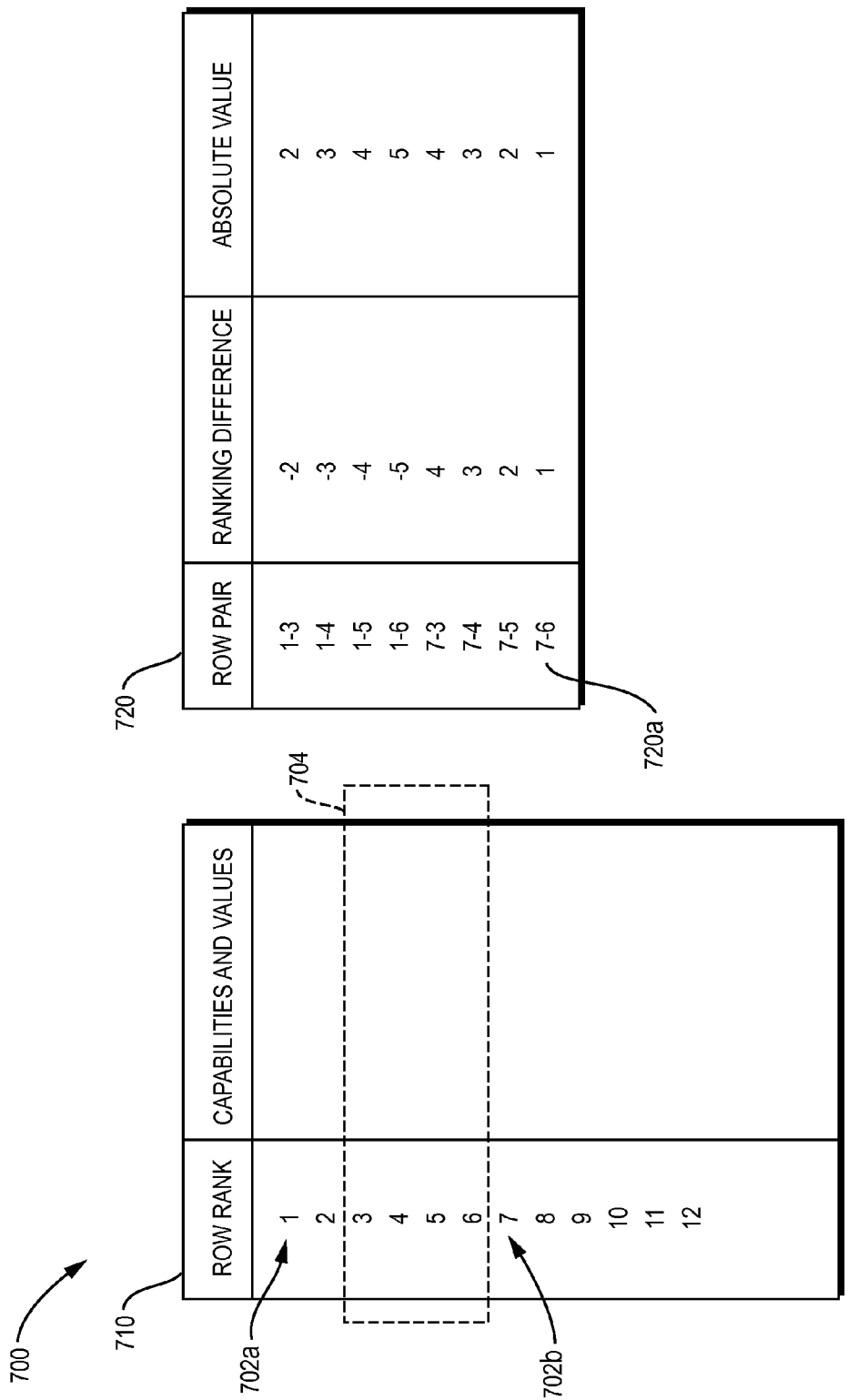
FIG. 8 is an example illustrating selection of a configuration of the capability profile in an embodiment in accordance with techniques herein.

To further illustrate, reference is made to FIG. 8. Assume that the embodiment has 3 ranked configuration tables as described above where the VVOL type is swap device and the ranked configuration table such as illustrated in FIG. 7 is selected in the fourth step noted above. In the example 700, shown are ranked rows of a configuration table 710 with 12 rows identifying the 12 possible candidate configurations, whereby 1 denotes the highest ranked row and configuration and 12 denotes the lowest ranked row and configuration. Table 710 may be ranked in an order similar to that as described elsewhere herein such as in connection with FIG. 7. However, for simplicity, the number of rows in the table 710 is reduced and the information of each row abstractly represented as illustrated.

Assume the capability profile identifies rows of the table with the following ranking number: 1 and 7, as denoted, respectively, by 702a,b. Thus, the first set includes rows having associated rankings 1 and 7. Also, assume the policy profile identifies rows of the table with the following ranking numbers: 3, 4, 5 and 6. Thus, the second set includes rows having rankings 3, 4, 5, and 6 as denoted by 704. The third set denoting the intersection of the first and second set of row is null or empty.

One or more pairs of rows may be determined where each pair includes a first row from the first set and a second row from the second set. A distance may be determined between each such pair of rows. The distance may represent the row distance between rows of the pair in terms of distance in the rankings associated with the two rows of the pair. The distance for a pair of rows, R1, R2, where R1 is a row identified by the capability profile and R2 is a row identified by the policy profile, may be calculated as:

$$\text{Distance}(R1,R2) = \text{absolute\_value}(R1 \text{ ranking} - R2 \text{ ranking}) \quad \text{EQUATION 1}$$

wherein

Distance (R1, R2) is the calculated resulting distance;

R1 ranking is the ranking in the configuration table for row R1;

R2 ranking is the ranking in the configuration table for row R2; and absolute_value represents the mathematical absolute value of the difference between the rankings. As known in the art, absolute value of a number is defined to be the number, if the number is greater than zero, and, if the number is less than zero, the mathematical product of −1 multiplied by the number thereby always yielding a positive result.

A distance may be determined using EQUATION 1 for each combination of row pairs R1, from the capability profile, and R2 from the policy profile. From all such pairs of rows, the pair of rows having the minimum distance is identified and the row R1 (of the minimum distance pair) that is from the first set of the capability profile is selected as the "best" and used as the configuration for provisioning storage for the request for the VVOL swap device type.

With reference to the example 700, the table 720 identifies the row pairs in first column ROW PAIR, an associated ranking difference (R1 ranking-R2 ranking) for the ROW PAIR in second column RANKING DIFFERENCE, and the absolute value of the RANKING DIFFERENCE for the ROW PAIR in the third column ABSOLUTE VALUE. Thus, the third column ABSOLUTE VALUE of table 720 represents distances or absolute values determined using EQUATION 1. The first column ROW PAIR includes pairs of rows where each pair includes a first row R1 that is from the capability profile and a second row R2 from the policy profile. In this example, row pair 720a has the minimum distance with row 7 (second row of the pair) being from the capability profile and row 7 is selected as the configuration to use for configuring storage for the request including the policy profile denoted by 704 for a capability profile identifying ranked rows 1 and 7.

Rather than determine the distances for all such pairs of rows as in 720, an embodiment may actually perform the distance calculation of EQUATION 1 for only two pairs of rows and then determine which of the two pairs of rows has the minimum distance as described above. A first row pair may be determined with R1=row 1 702a from the capability profile and the row R2=3, where R2 is selected as the row from the policy profile that is closest to R1=1. A second row pair may be determined with R1=row 7 702b from the capability profile and the row R2=6, where R2 is selected as the row from the policy profile that is closest to R1=7. Thus, generally, an embodiment may form a set of row pairs where each pair includes a first row from the capability profile. For each pair, a second row may be selected from the policy profile, where the second row has an associated rank that, with respect to all rows in the policy profile, is closest in rank to the first row of the same pair.

Thus, the foregoing describes use of a ranking table (e.g., ranked list of table rows each corresponding to a different resource configuration candidate). Although the foregoing example is performed with respect to a particular selected ranked configuration table, more generally such technique may be performed with respect to any one of the above-mentioned 3 ranked configuration tables (e.g., where the 3 ranked configuration tables are generated in the second step described above and where the particular one used is the one selected in the fourth step also described above). Techniques herein may be performed that determine the one or more ranking tables of all possible candidate storage resource configuration where each candidate storage resource configuration may be expressed as a row in each of the ranking tables. In an embodiment having multiple ranked configuration tables, a particular one of the ranking tables or ranked configuration tables may be selected based on usage criteria, such as based on VVOL type. The capability profile may be expressed as the first set of rows of the selected ranking table where the first set may identify all or a portion of the rows corresponding to supported storage configurations that can be used to provision resources for a request. The policy profile may be expressed as the second set of rows of the selected ranking table where the second set may identify all or a portion of the rows corresponding to storage configurations that meet requested configuration options for provisioning resources. Processing described herein selects one of the storage resource configurations identified by the capability profile that has the best or most optimal set of storage resource configuration parameters (e.g., constraints or values for the exposed capabilities).

Based on an example with a single capability profile, a single policy profile, and 3 ranked configuration tables for 3 different VVOL types, or more generally, 3 different sets of usage criteria, one of the following may result from processing performed in accordance with techniques as described herein.

As a first case, one or more rows of the first set, corresponding to storage configurations of the capability profile, may match one or more rows of the second set, corresponding to storage configuration of the policy profile. As described above, the resulting third set or intersection may be a subset of one or more rows of the ranking table. If there is only a single row/configuration in the third set, that single configuration may be used to provision storage resources for the requested VVOL. However, if the third set includes multiple rows/configuration, one row/configuration of the third set may be selected based on one or more criteria. In one embodiment, such criteria may depending on the intended use of the VVOL for which storage is being allocated. The intended use may be based on the VVOL type included in the request. For example, for a type of VM configuration device, thin provisioning may be used and cost efficient storage may be required. In contrast, for a type of VM swap device, the highest performance storage available may be used thick device allocation may be required. Based on such requirements the best matching configuration is chosen from the subset (e.g., third set or intersection noted above). Assuming the configuration table includes rows ranked as described herein with the higher the priority of a row/configuration, to closer the row/configuration is to the top of the table, the row selected may be that row closest to the top of the ranked configuration table.

As a second case, there may be no row of the capability profile that matches a row of the policy profile. In this case, the third set/intersection is empty. An embodiment may return an error or failure in response to this second case occurring.

As a third case, there may be no row of the capability profile that matches a row of the policy profile as noted above for the second case. However, for the third case, additional processing may be performed to select one row/configuration identified by the capability profile that is a best configuration in accordance with criteria. Such additional processing may include identifying that row of the ranking table which is 1) identified by the capability profile and 2) has the minimum distance as described above.

As a fourth case, a storage policy profile may not be provided or may be empty. In this case, it is necessary to provision storage for the requested VVOL based on specified configuration defaults. In this fourth case, a row may be selected from the first set (configurations of the capability profile) based on the intended use of the VVOL. As described above, the intended use may be inferred from the VVOL type provided as an input of the request. Based on the VVOL type, a determination may be made as to whether cost efficiency or performance is more important, or whether a balance between cost and efficiency is desired. For VVOL configuration device type, cost efficiency is more important than performance and the above-mentioned second ranked configuration table may be used and the configuration of the capability profile having the highest ranked row of the second ranked configuration table may be selected. For the VVOL swap device type, performance is more important than cost efficiency, and the above-mentioned first ranked configuration table (e.g., such as illustrated in FIG. 7) may be used and the configuration of the capability profile having the highest ranked row of the first ranked configuration table may be selected. For the VVOL VM data device type, a balance between performance and cost is desired, and the above-mentioned third ranked configuration table may be used and the configuration of the capability profile having the highest ranked row of the third ranked configuration table may be selected.

As mentioned elsewhere herein, techniques described herein have broad applicability and may include storage resource related parameters (e.g., drive type, RAID type, etc.) as noted above and may also be used with other resources and configuration parameters. For example, techniques herein may also be used to specify capabilities and constraints for networking parameters (e.g., available bandwidth or throughput of FAs, available bandwidth or throughput of paths or connections between a host and the data storage system, and the like). As another example, techniques herein may also be used to specify capabilities and constraints for different data storage system facilities and services such as snapshots and remote replication. For example, with snapshots, the data storage system may expose a capability related to snapshot frequency where the capability has possible values identifying different frequencies that snapshot may be created (e.g., daily, weekly, etc.).

What will now be described are flowcharts 800 and 850, respectively, in FIGS. 9 and 10, summarizing processing described above that may be performed in an embodiment in accordance with techniques herein. It should be noted that processing of FIGS. 9 and 10 assume that there is at least one storage resource configuration identified in a received policy profile.

Figure 9:
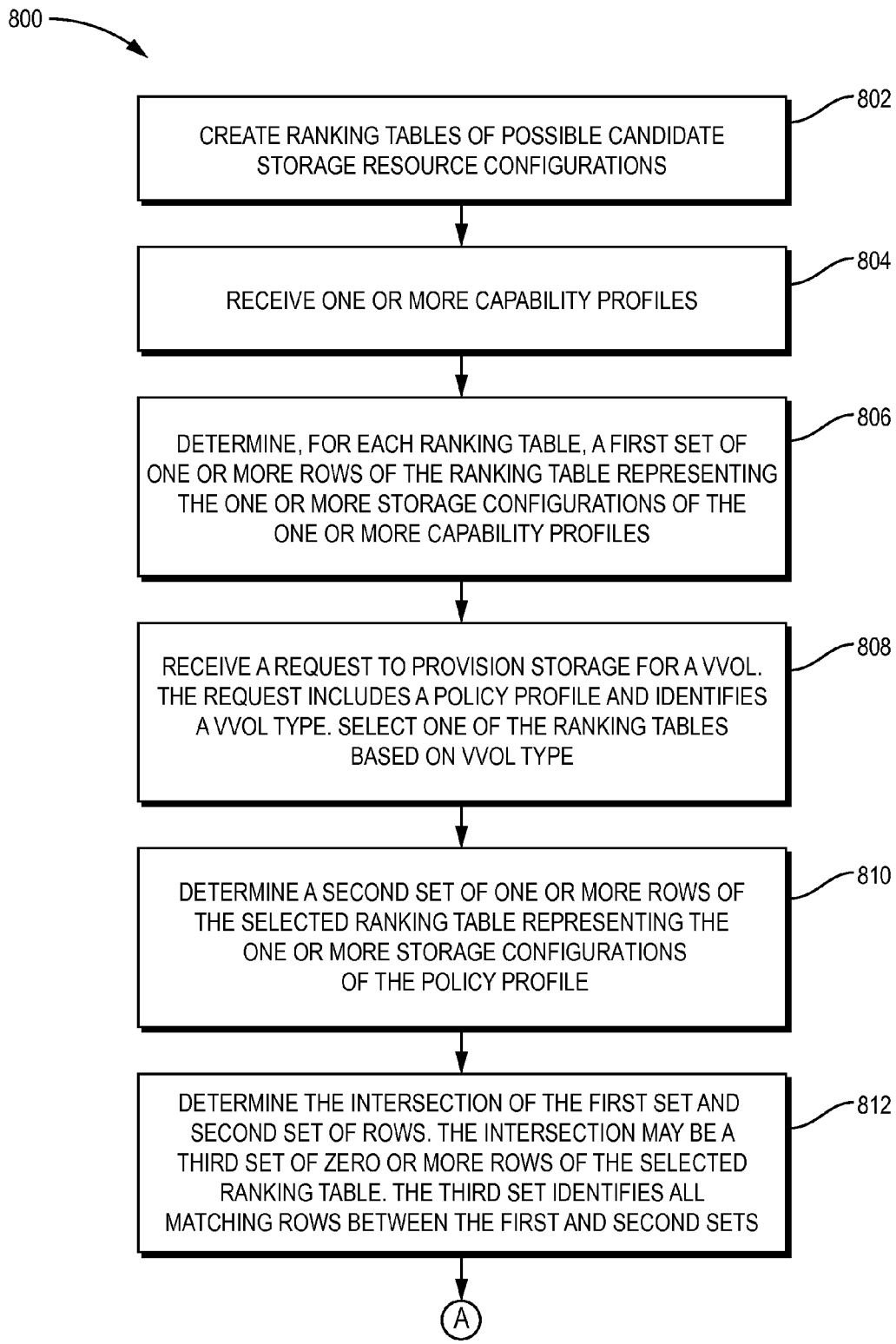
FIGS. 9 and 10 are flowcharts of processing steps that may be performed in an embodiment in accordance with techniques herein.
Figure 10:
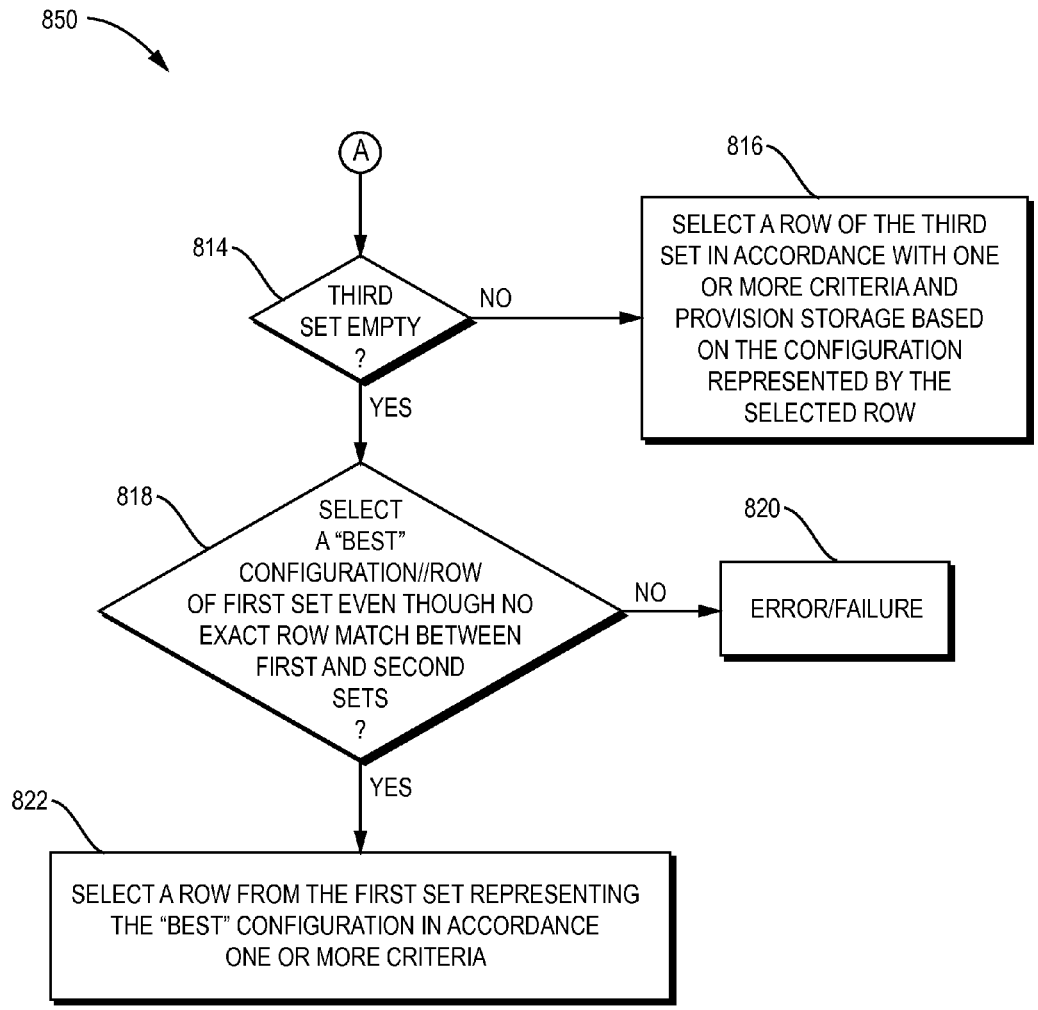

Referring now to FIG. 9, shown is the flowchart 800. At step 802, one or more ranking tables of all possible candidate storage resource configurations may be created. For example, in one embodiment having 3 VVOL types, or more generally, 3 different sets of usage criteria each having their own ranking or ordering of such criteria, 3 corresponding ranking tables may be created (e.g., such as described in connection with second step in paragraphs above). FIG. 7 is an example of one such ranking table created where performance is critical and has a higher priority than cost such as for the VVOL swap device type. At step 804, one or more capability profiles may be received identifying different storage resource configurations supported and available for provisioning storage. At step 806, for each of the ranking tables created in step 802, a first set of one or more rows of the ranking table are determined where the first set represents the one or more storage configurations specified by the one or more capability profiles. At step 808, a request is received to provision storage for a VVOL. The request may include a policy profile and may also identify a VVOL type. Step 808 may also include selecting one of the ranking tables created in step 802 based on the VVOL type, or more generally, usage criteria that may be specified in the request. For example, if VVOL type is swap device, the first ranked configuration table described above, such as represented by FIG. 7, may be selected. Step 808 may also include selecting a particular one of the first sets (as determined in step 806) for the selected table, At step 810, a second set of one or more rows of the selected ranking table are determined where the second set represents the one or more storage configurations of the policy profile. At step 812, processing is performed that determines the intersection of the first set and second set of rows. The intersection may be a third set of zero or more rows of the ranking table. The third set identifies all matching rows between the first and second sets. At step 814, a determination may be made as to whether the third set is empty. If step 814 evaluates to no, control proceeds to step 816 to select a row of the third set in accordance with one or more criteria and provision storage based on the configuration represented by the selected row. The selected row may represent the best matching configuration/row of the third set based on the one or more criteria. In one embodiment as described herein, the criteria used in step 816 may be based on usage criteria such as the VVOL type identifying an intended usage of the VVOL for which storage is being provisioned (per the request received in step 808). If step 814 evaluates to yes, control proceeds to step 818. In step 818, a determination is made as to whether processing is to be performed to select a best configuration or row of the first set even though there is no exact row match between the first and second sets. If step 818 evaluates to no, control proceeds to step 820 to return an error denoting the provisioning failure. If step 818 evaluates to yes, control proceeds to step 822 to select a row from the first set representing the "best" configuration in accordance one or more criteria, such as the usage criteria inferred from the VVOL type. In one embodiment as described herein, the best configuration may correspond to the row of the first set having a minimum distance as described elsewhere herein (e.g., that is closest, of all rows in the first set, to any row of the second set).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of provisioning storage for a logical device comprising:
    receiving, using a processor, at least one capability profile identifying a first set of one or more storage resource configurations, wherein each storage resource configuration of the first set is a current storage resource configuration supported on a data storage system;
    receiving, using a processor, a request to provision storage for the logical device, the request identifying a first logical device type of a plurality of predefined logical device types, and wherein the request also includes a policy profile identifying a second set of one or more storage resource configurations, wherein each storage resource configuration of the second set is a requested storage resource configuration acceptable for provisioning storage for the logical device;
    determining, using a processor, a third set of zero or more storage resource configurations, said third set being a set intersection of the first set and the second set;
    creating, using a processor, a plurality of ranking tables each including rows of candidate storage resource configurations ranked in accordance with one or more usage criteria, wherein each storage resource configuration in the at least one capability profile and the policy profile is represented by one of the rows of each of the plurality of ranking tables, wherein each of the plurality of ranking tables corresponds to a different one of the plurality of predefined logical device types and said each ranking table denotes a corresponding prioritized ranking of the candidate storage resource configurations for said different one of the plurality of predefined logical device types;
    selecting, using a processor, a first of the plurality of ranking tables corresponding to the first logical device type identified in the request;
    determining, using a processor, whether the third set includes zero storage configurations;
    if the third set includes zero storage configurations, performing first processing, using a processor and the first ranking table for the first logical device type, to select a first storage configuration identified in the capability profile for provisioning storage for the logical device, said first processing including:
        determining a fourth set including pairs of rows, each pair of rows of the fourth set including a first row of the first ranking table corresponding to a storage resource configuration of the capability profile and a second row of the first ranking table corresponding to a storage resource configuration of the policy profile, and wherein a distance is defined between each pair of rows of the fourth set, said distance for said each pair of rows representing a distance in the ranking table between the first row of said each pair and the second row of said each pair; and
        determining one pair of rows of the fourth set having a minimum distance with respect to all distances of all pairs of rows of the fourth set, wherein the first storage configuration corresponds to the first row of the one pair of the fourth set having the minimum distance.

2. The method of claim 1, wherein the at least one capability profile includes at least a first capability identifying whether automated storage tiering and movement of data between storage tiers is used in a configuration, and wherein the method further comprises:
    determining whether the third set includes at least one storage resource configuration; and
    if it is determined that the third set includes at least one storage resource configuration, selecting one of the at least one storage resource configurations of the third set and provisioning storage of the logical device in accordance with the selected one storage resource configuration of the third set.

3. The method of claim 2, wherein the third set includes zero storage resource configurations thereby indicating that no storage resource configuration of the first set supported by the data storage system matches a requested storage configuration of the second set, wherein said first storage resource configuration determined by the first processing is a best configuration of the first set to use for provisioning storage for the logical device in accordance with the one or more usage criteria, and the method includes:
    provisioning storage of the logical device in accordance with the selected first storage resource configuration.

4. The method of claim 3, wherein determining a third set of zero or more storage resource configurations that is a set intersection of the first set and the second set further comprises:

expressing the first set of storage resource configurations as a first set of one or more rows of the first ranking table;

expressing the second set of storage resource configurations as a second set of one or more rows of the first ranking table; and determining what one or more rows, if any, in the first set of one or more rows match any row in the second set of one or more rows of the first ranking table.

5. The method of claim 4, wherein the rows of the first ranking table are ranked in priority order, from highest to lowest priority, in accordance with a priority ordering of capabilities and, for each of the capabilities, a priority ordering of associated values for said each capability, wherein the priority ordering of the capabilities and the priority ordering of associated values for each of the capabilities is in accordance with the one or more usage criteria.

6. The method of claim 5, wherein the third set is a plurality of storage resource configurations each having a corresponding row in the first ranking table, and wherein the method further includes:

determining, in accordance with the first ranking table, a priority for each of the plurality of storage resource configurations of the third set;

selecting, in accordance with the one or more usage criteria, one of the plurality of storage resource configurations of the third set, wherein the one or more usage criteria includes the first logical device type included in the request; and provisioning storage for the logical device in accordance with the selected one storage resource configuration of the third set.

7. The method of claim 6, wherein the logical device is used by a virtual machine in a virtualization environment.

8. The method of claim 7, wherein said plurality of predefined logical device types include a configuration device including configuration information for a virtual machine of the virtualization environment, a swap device for a virtual machine of the virtualization environment, and a data device used to store data of an application executing in a context of a virtual machine in the virtualization environment.

9. The method of claim 6, wherein the first logical device type is used to determine an indication of priority of cost efficiency and performance in connection with provisioning storage for the logical device, and wherein said indication is thereby inferred from the one or more usage criteria used in selecting the one of the plurality of storage resource configurations of the third set.

10. The method of claim 9, wherein each of the plurality of ranking tables include a priority ranking for a different one of the plurality of predefined logical device types based on a different set of one or more usage criteria, wherein each of the plurality of ranking tables ranks the candidate storage resource configurations in accordance with cost and performance, wherein a first of the candidate storage resource configurations of the first ranking table that is ranked higher than a second of the candidate storage resource configurations of the first ranking table indicates that the first candidate storage resource configuration has a higher performance and a higher cost than the second candidate storage resource configuration.

11. The method of claim 5, wherein the capabilities include any of the first capability, a second capability identifying whether flash-based storage is included in a configuration, a third capability identifying one or more physical device types or storage tiers from which storage can be provisioned in a configuration, a fourth capability identifying one or more RAID group types from which storage can be provisioned in a configuration, a fifth capability identifying whether an additional caching tier of flash-based storage is used in a configuration, and a sixth capability identifying whether a logical device having storage provisioned is created as a virtually provisioned logical device.

12. The method of claim 1, wherein the policy profile includes at least one capability and at least one constraint associated with said at least one capability.

13. The method of claim 1, wherein the at least one capability profile includes at least one constraint associated with at least one capability.

14. The method of claim 1, further comprising:

provisioning storage for the logical device in accordance with the first storage resource configuration corresponding to the first row of the one pair of rows of the fourth set having the minimum distance.

15. A non-transitory computer readable medium comprising code stored thereon that, when executed, performs a method of provisioning storage for a logical device comprising:

receiving at least one capability profile identifying a first set of one or more storage resource configurations, wherein each storage resource configuration of the first set is a current storage resource configuration supported on a data storage system;

receiving a request to provision storage for the logical device, the request identifying a first logical device type of a plurality of predefined logical device types, and wherein the request also includes a policy profile identifying a second set of one or more storage resource configurations, wherein each storage resource configuration of the second set is a requested storage resource configuration acceptable for provisioning storage for the logical device;

determining a third set of zero or more storage resource configurations, said third set being a set intersection of the first set and the second set;

creating a plurality of ranking tables each including rows of candidate storage resource configurations ranked in accordance with one or more usage criteria, wherein each storage resource configuration in the at least one capability profile and the policy profile is represented by one of the rows of each of the plurality of ranking tables, wherein each of the plurality of ranking tables corresponds to a different one of the plurality of predefined logical device types and said each ranking table denotes a corresponding prioritized ranking of the candidate storage resource configurations for said different one of the plurality of predefined logical device types;

selecting a first of the plurality of ranking tables corresponding to the first logical device type identified in the request;

determining whether the third set includes zero storage configurations;

if the third set includes zero storage configurations, performing first processing, using the first ranking table for the first logical device type, to select a first storage configuration identified in the capability profile for provisioning storage for the logical device, said first processing including:

determining a fourth set including pairs of rows, each pair of rows of the fourth set including a first row of the first ranking table corresponding to a storage resource configuration of the capability profile and a second row of the first ranking table corresponding to a storage resource configuration of the policy profile, and wherein a distance is defined between each pair of rows of the fourth set, said distance for said each pair of rows representing a distance in the ranking table between the first row of said each pair and the second row of said each pair; and determining one pair of rows of the fourth set having a minimum distance with respect to all distances of all pairs of rows of the fourth set, wherein the first storage configuration corresponds to the first row of the one pair of the fourth set having the minimum distance.

16. The non-transitory computer readable medium of claim 15, wherein the method further comprises:

provisioning storage of the logical device in accordance with the first storage resource configuration selected by said first processing.

17. The non-transitory computer readable medium of claim 16, wherein determining a third set of zero or more storage resource configurations that is a set intersection of the first set and the second set further comprises:

expressing the first set of storage resource configurations as a first set of one or more rows of the first ranking table;

expressing the second set of storage resource configurations as a second set of one or more rows of the first ranking table; and determining what one or more rows, if any, in the first set of one or more rows match any row in the second set of one or more rows of the first ranking table.

18. The non-transitory computer readable medium of claim 17, wherein the rows of the first ranking table are ranked in priority order, from highest to lowest priority, in accordance with a priority ordering of capabilities and, for each of the capabilities, a priority ordering of associated values for said each capability, wherein the priority ordering of the capabilities and the priority ordering of associated values for each of the capabilities is in accordance with the one or more usage criteria.

19. A system comprising:

a processor; and a memory comprising code stored therein that, when executed, performs processing for provisioning storage for a logical device comprising:

receiving, using the processor, at least one capability profile identifying a first set of one or more storage resource configurations, wherein each storage resource configuration of the first set is a current storage resource configuration supported on a data storage system;

receiving, using the processor, a request to provision storage for the logical device, the request identifying a first logical device type of a plurality of predefined logical device types, and wherein the request also includes a policy profile identifying a second set of one or more storage resource configurations, wherein each storage resource configuration of the second set is a requested storage resource configuration acceptable for provisioning storage for the logical device;

determining, using the processor, a third set of zero or more storage resource configurations, said third set being a set intersection of the first set and the second set;

creating, using the processor, a plurality of ranking tables each including rows of candidate storage resource configurations ranked in accordance with one or more usage criteria, wherein each storage resource configuration in the at least one capability profile and the policy profile is represented by one of the rows of each of the plurality of ranking tables, wherein each of the plurality of ranking tables corresponds to a different one of the plurality of predefined logical device types and said each ranking table denotes a corresponding prioritized ranking of the candidate storage resource configurations for said different one of the plurality of predefined logical device types;

selecting, using the processor, a first of the plurality of ranking tables corresponding to the first logical device type identified in the request;

determining, using the processor, whether the third set includes zero storage configurations;

if the third set includes zero storage configurations, performing first processing, using the processor and the first ranking table for the first logical device type, to select a first storage configuration identified in the capability profile for provisioning storage for the logical device, said first processing including:

determining a fourth set including pairs of rows, each pair of rows of the fourth set including a first row of the first ranking table corresponding to a storage resource configuration of the capability profile and a second row of the first ranking table corresponding to a storage resource configuration of the policy profile, and wherein a distance is defined between each pair of rows of the fourth set, said distance for said each pair of rows representing a distance in the ranking table between the first row of said each pair and the second row of said each pair; and determining one pair of rows of the fourth set having a minimum distance with respect to all distances of all pairs of rows of the fourth set, wherein the first storage configuration corresponds to the first row of the one pair of the fourth set having the minimum distance.

20. The system of claim 19, wherein the processing further comprises:

provisioning storage for the logical device in accordance with the first resource configuration selected by said first processing.

21. The system of claim 20, wherein determining a third set of zero or more resource configurations that is a set intersection of the first set and the second set further comprises:

expressing the first set of resource configurations as a first set of one or more rows of the first ranking table;

expressing the second set of resource configurations as a second set of one or more rows of the first ranking table; and determining what one or more rows, if any, in the first set of one or more rows match any row in the second set of one or more rows of the first ranking table.

* * * * *

UNITED STATES PATENT AND TRADEMARK OFFICE
CERTIFICATE OF CORRECTION

PATENT NO. : 10,013,196 B2
APPLICATION NO. : 14/646422
DATED : July 3, 2018
INVENTOR(S) : Tylik et al.

Page 1 of 1

It is certified that error appears in the above-identified patent and that said Letters Patent is hereby corrected as shown below:

On the Title Page

The Applicant should read:
(71) Applicant: EMC IP Holding Company LLC, Hopkinton, MA (US)

Signed and Sealed this
Nineteenth Day of February, 2019

Andrei Iancu
*Director of the United States Patent and Trademark Office*